US008619328B2

(12) United States Patent
Kashibuchi et al.

(10) Patent No.: US 8,619,328 B2
(45) Date of Patent: Dec. 31, 2013

(54) IMAGE PROCESSING APPARATUS AND IMAGE PROCESSING METHOD

(75) Inventors: Yoichi Kashibuchi, Tokyo (JP); Hiroshi Kaburagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 867 days.

(21) Appl. No.: 12/730,602

(22) Filed: Mar. 24, 2010

(65) Prior Publication Data

US 2010/0265549 A1 Oct. 21, 2010

(30) Foreign Application Priority Data

Apr. 17, 2009 (JP) ................................. 2009-101381

(51) Int. Cl.
*H04N 1/405* (2006.01)
(52) U.S. Cl.
USPC .............................. 358/3.06; 358/1.9; 358/2.1
(58) Field of Classification Search
USPC .............. 358/1.9, 3.06, 3.08, 3.27, 1.14, 1.15
See application file for complete search history.

(56) References Cited

U.S. PATENT DOCUMENTS

| 6,016,154 | A  | * | 1/2000 | Moroo et al. ................. 345/442 |
| 6,529,287 | B1 | * | 3/2003 | Wang et al. .................. 358/1.15 |
| 6,781,718 | B2 | * | 8/2004 | Sato ............................... 358/1.9 |
| 7,164,504 | B1 | * | 1/2007 | Yamazaki ..................... 358/3.08 |
| 7,706,021 | B2 |   | 4/2010 | Kaburagi ........................ 358/1.9 |
| 2006/0092475 | A1 | * | 5/2006 | Kaburagi ..................... 358/3.27 |
| 2008/0085062 | A1 | * | 4/2008 | Tsuruoka ...................... 382/284 |

FOREIGN PATENT DOCUMENTS

| JP | 10-042141 A  | 2/1998  |
| JP | H11-331603   | 11/1999 |
| JP | 2002-281317  | 9/2002  |
| JP | 2006-295877 A | 10/2006 |

OTHER PUBLICATIONS

JPO Office Action issued on Jun. 24, 2013 in Japanese counterpart patent application 2009-101381, with translation.

* cited by examiner

*Primary Examiner* — Allen H Nguyen
(74) *Attorney, Agent, or Firm* — Fitzpatrick, Cella, Harper & Scinto

(57) ABSTRACT

For reducing jaggies in second image data based on first image data, the second image data obtained by performing digital halftoning on each image signal of the first image data, and attribute data indicating the attribute of each pixel in the first image data, a determination signal indicating whether or not to perform smoothing processing is output based on the first image data, edge correction data for the smoothing processing is generated from the first image data, and whether or not to perform edge correction processing that uses the edge correction data is selected according to the determination signal and the attribute data. Moreover, the second image data and the edge correction data are compared for each image signal so as to output either one thereof according to the comparison result.

8 Claims, 22 Drawing Sheets

TOP VIEW OF ORIGINAL TABLE

SIDE VIEW

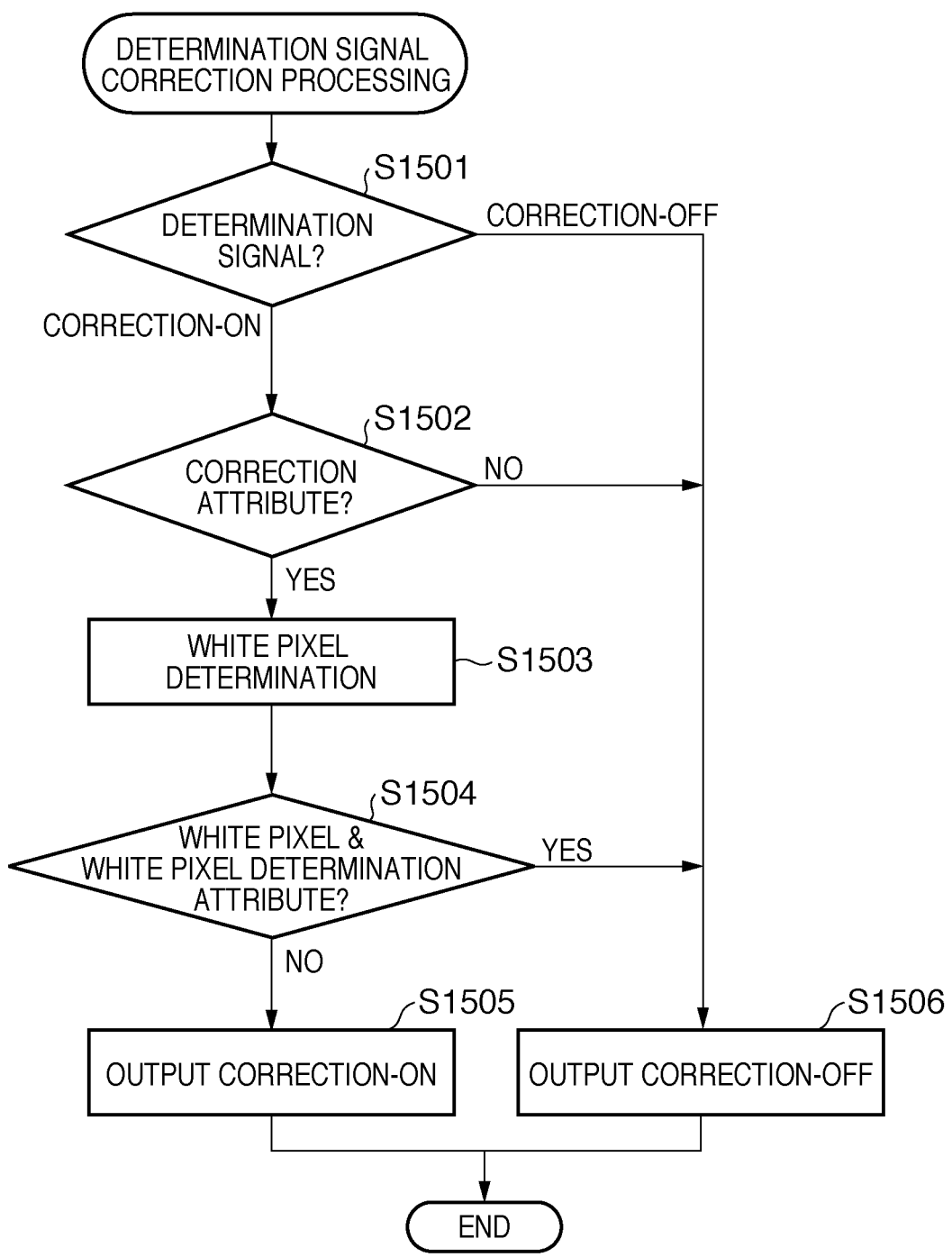

FIG. 10A
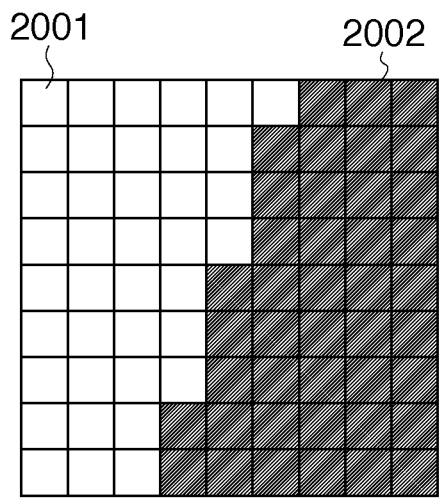
FIG. 10B
FIG. 10C
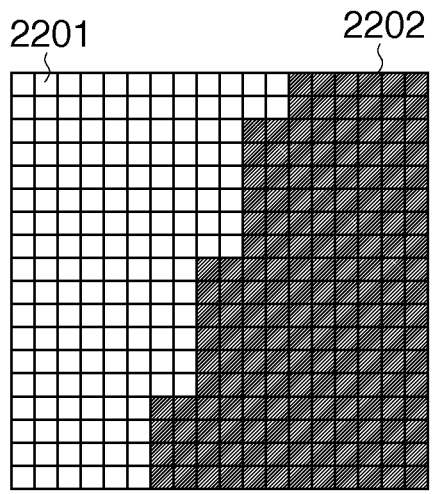
FIG. 10D
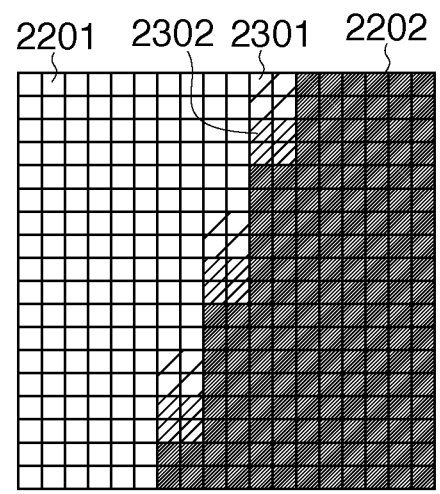

| INPUT VALUE | OUTPUT VALUE |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |

| INPUT VALUE | OUTPUT VALUE |
|---|---|
| 0 | 0 |
| 1 | 1 |
| 2 | 1 |
| 3 | 1 |
| 4 | 2 |
| 5 | 2 |
| 6 | 3 |
| 7 | 3 |
| 8 | 3 |
| 9 | 4 |
| 10 | 5 |
| 11 | 6 |
| 12 | 7 |
| 13 | 9 |
| 14 | 11 |
| 15 | 15 |

| INPUT VALUE | OUTPUT VALUE |
|---|---|
| 0 | 0 |
| 1 | 3 |
| 2 | 5 |
| 3 | 7 |
| 4 | 8 |
| 5 | 9 |
| 6 | 10 |
| 7 | 11 |
| 8 | 12 |
| 9 | 12 |
| 10 | 13 |
| 11 | 13 |
| 12 | 14 |
| 13 | 14 |
| 14 | 15 |
| 15 | 15 |

IMAGE PROCESSING APPARATUS AND IMAGE PROCESSING METHOD

BACKGROUND OF THE INVENTION

1. Field of the Invention

The present invention relates to an image processing apparatus and an image processing method that reduce jaggies in edge portions of image data performed digital halftoning.

2. Description of the Related Art

Conventionally, some techniques have been proposed for reducing notches called jaggies that occur in edge portions of characters or the like in an image processing apparatus. There are various reasons why jaggies can occur, based on the type of jaggies. Jaggies can be roughly divided into two kinds, stairs of pixels caused by a low-resolution printer and notches caused by digital halftoning such as screen processing.

For reducing the former stairs of pixels, there is, for example, a technique to match patterns on binary images so as to detect edges and to thereby add a pixel that corresponds to a pattern to a matched location or remove a pixel (see Japanese Patent Laid-Open No. 10-42141, for example). With this technique, the locations of jaggies are detected by pattern matching and then smoothing processing is implemented on edge portions by adding data obtained as a result of dividing a single pixel into multiple pixels in the case of a binary printer, or by adding an intermediate level of dots in the case of a multi-value printer.

For reducing the latter notches, there is, for example, a technique for generating correction data from image data performed pre-digital halftoning and then adding the correction data to edge portions of image data performed digital halftoning so as to fringe the edge portions (see Japanese Patent Laid-Open No. 2006-295877, for example). With this technique, jaggies caused by screen processing are reduced by determining whether or not to smoothing processing is to be performed on an edge portion and then, if the edge portion necessitates smoothing processing, comparing the correction data and the image data performed digital halftoning and outputting the data with the higher value. This technique further concurrently reduces the former stairs of pixels caused by a low-resolution printer, despite its simple architecture.

The above-described technique, however, poses the problem of adverse effects caused by the use of attribute data at the time of determining whether or not to perform smoothing processing on an edge portion, the attribute data representing the attributes of objects included in image data, such as characters, lines, figures, and images. In other words, the determination of an edge portion according to the attribute data means determining an edge portion where objects (attributes) are switched, so that in some cases smoothing processing may be performed on a boundary between objects of the same color and different attributes that is not regarded as an edge portion from the pixel values of the objects. For example, FIG. 17 illustrates the result of smoothing processing performed on contone (an abbreviation for "continuous tone") image data illustrated in FIG. 12A, attribute data illustrated in FIG. 10B, and halftone image data illustrated in FIG. 12B, using the technique of Japanese Patent Laid-Open No. 2006-295877. Referring to the attribute data in FIG. 10B, "I" represents the attribute of an image and "G" represents the attribute of a graphic, and it can be seen from FIG. 17 that there is a problem in that smoothing processing adds correction data to the boundary between the image and the graphic.

SUMMARY OF THE INVENTION

The present invention provides an image processing apparatus which reduces notches in edge portions by determining whether or not to perform smoothing processing according to the density difference of image data, instead of attribute data, and then performing smoothing processing on only an edge portion of pixel values.

In order to solve the above-described problem, an image processing apparatus according to the present invention for reducing a jaggy in second image data, based on first image data, the second image data obtained as a result of performing digital halftoning on each image signal of the first image data, and attribute data representing an attribute of each pixel included in the first image data, comprises: a smoothing determination unit configured to output a determination signal that indicates whether or not to perform smoothing processing, based on the first image data; an edge correction data generation unit configured to generate edge correction data for the smoothing processing from the first image data; and an edge correction unit configured to select whether or not to perform edge correction processing according to the determination signal and the attribute data, the edge correction processing using the edge correction data generated by the edge correction data generation unit.

An image processing method according to the present invention of reducing a jaggy in second image data based on first image data, the second image data obtained as a result of performing digital halftoning on each image signal of the first image data, and attribute data representing an attribute of each pixel included in the first image data, the method comprises the steps of: outputting a determination signal indicating whether or not to perform smoothing processing, based on the first image data; generating edge correction data for the smoothing processing from the first image data; and selecting whether or not to perform edge correction processing according to the determination signal and the attribute data, the edge correction processing using the edge correction data generated in the generating step.

The present invention allows smoothing processing to be performed only on an edge portion of pixel values and not on an edge portion of attributes, by generating a determination signal that determines whether or not to perform smoothing processing according to the density difference of contone image data. This solves the problem that smoothing processing may add correction data to the boundary between objects of the same color and different attributes.

In addition, the determination signal is corrected according to attribute data, which makes it possible to prevent unnecessary smoothing processing from being performed on an object that will be subjected to smoothing processing if it is determined by only its pixel value but that has an attribute that does not necessitate smoothing processing.

Further features of the present invention will become apparent from the following description of exemplary embodiments with reference to the attached drawings.

BRIEF DESCRIPTION OF THE DRAWINGS

FIGS. 5A and 5B illustrate examples of an edge pattern according to the first embodiment.

FIG. 6B is a flow chart of determination signal correction processing according to the first embodiment.

FIG. 10A illustrates a first example of contone image data according to the first embodiment.

FIG. 10B illustrates an example of attribute data according to FIG. 10A.

FIG. 10C illustrates an example of halftone image data according to FIG. 10A.

FIG. 10D illustrates an example of the result of the smoothing processing according to FIG. 10A.

DESCRIPTION OF THE EMBODIMENTS

Hereinafter, embodiments of the present invention will be described in detail with reference to the accompanying drawings.

First Embodiment

Figure 1:
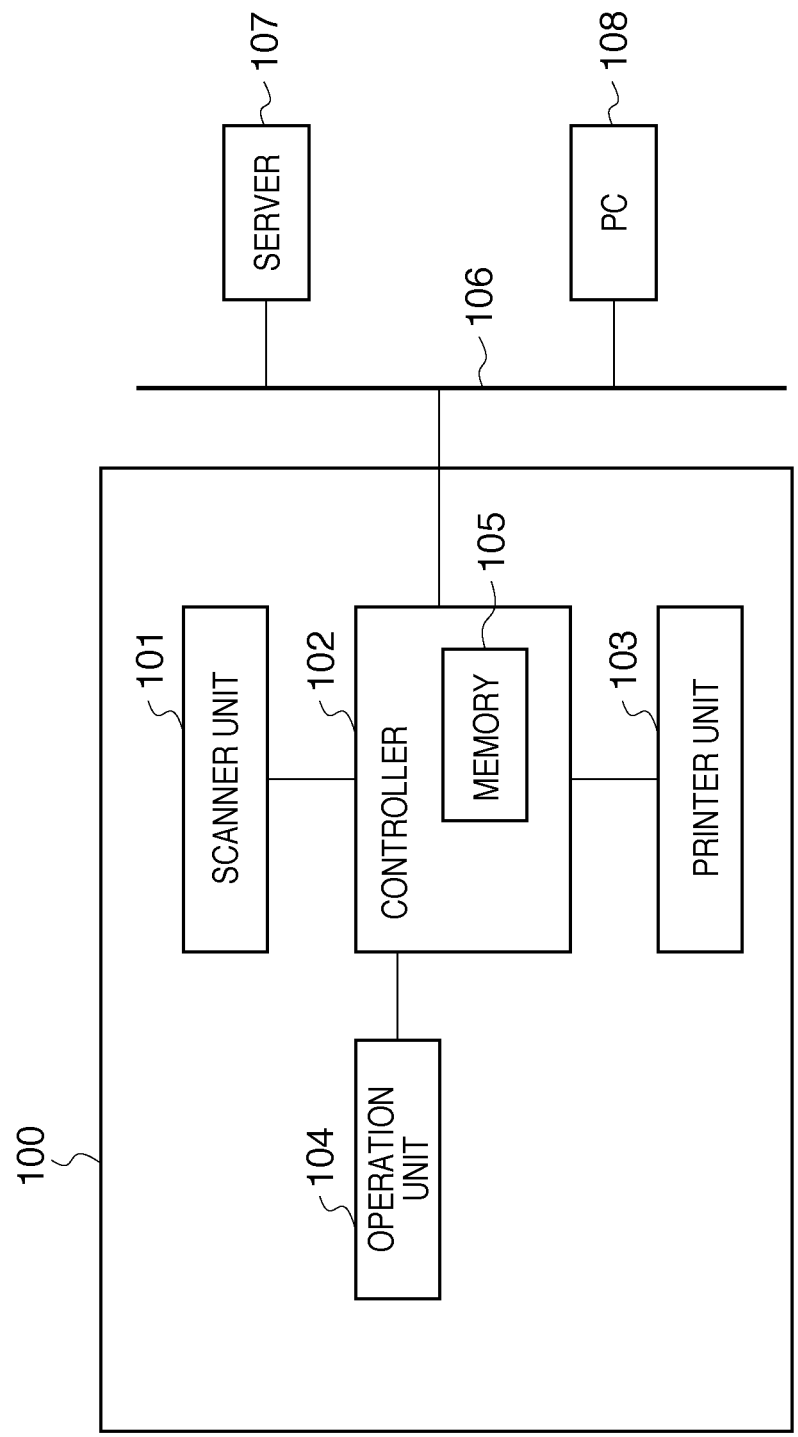
FIG. 1 is a schematic block diagram of an image processing apparatus according to an embodiment of the present invention.

Example Configuration and Image Processing Apparatus according to Embodiment of Present Invention FIG. 1 is a schematic block diagram of an image processing apparatus 100, for example, a block diagram of a digital multi-functional peripheral having common functions such as COPY, PRINT, and FAX.

The image processing apparatus 100 according to the present embodiment includes a scanner unit 101 that reads an original, and a controller 102 that performs image processing on image data that has been read by the scanner unit 101 and stores the image data into a memory 105. It further includes an operation unit 104 that sets various printing conditions for image data that has been read by the scanner unit 101. The image processing apparatus also includes a printer unit 103 or the like that visualizes image data that has been read from the memory 105 according to the printing conditions that have been set by the operation unit 104 so as to form an image on recording paper. The image processing apparatus 100 is connected via a network 106 to a server 107 that manages image data, a personal computer (PC) 108 that gives an instruction to execute printing to the image processing apparatus 100, and so on. Also, the controller 102 rasterizes print data that is transmitted upon instruction to execute printing from the server 107 or the PC 108, into image data and stores the rasterized image data into the memory 105.

Figure 2A:
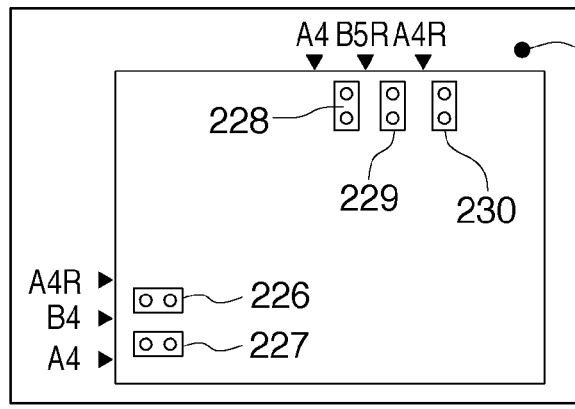
FIGS. 2A to 2C are top, cross-sectional and side views of an image processing apparatus according to an embodiment of the present invention.
Figure 2C:
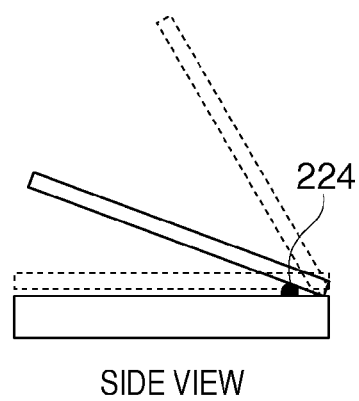
Figure 2B:
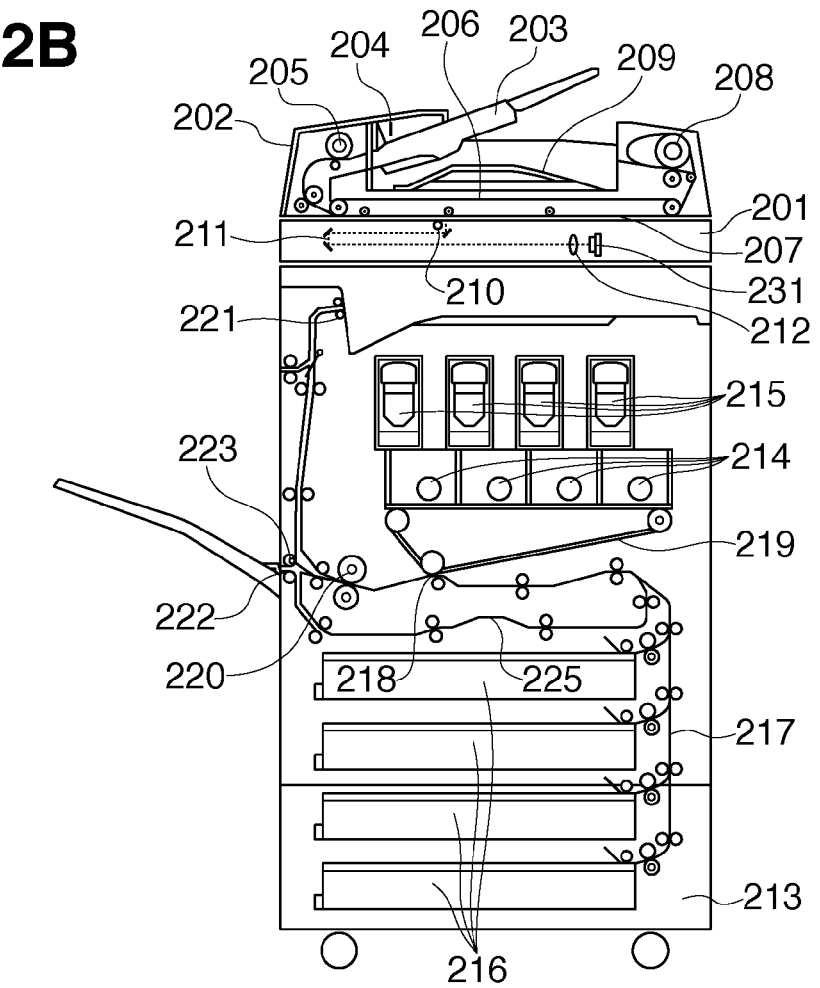

FIGS. 2A to 2C are cross-sectional views of the image processing apparatus 100. A more detailed configuration of the image processing apparatus 100 that has been described with reference to FIG. 1 will be described with reference to FIGS. 2A to 2C. The image processing apparatus 100 has functions such as COPY, PRINT, and FAX. Referring to FIGS. 2A to 2C, the image processing apparatus 100 according to an embodiment of the present invention includes the scanner unit 101, a document feeder (DF) 202, and the printer unit 103 for print recording that includes four color drums.

First described is a read operation for the COPY function, which is mainly performed by the scanner unit 101. For setting and reading an original on an original platen 207, a user sets an original on the original platen 207 and closes the DF 202. Then, an open/close sensor 224 detects that the original platen 207 has been closed, and thereafter, light-reflective original-size detection sensors 226 to 230 that are provided in the housing of the scanner unit 101 detect the size of the original. With this size detection as the starting point, a light source 210 irradiates the original, and a CCD (charge-coupled device) 231 reads an image by receiving the reflected light from the original via a reflector 211 and a lens 212. The controller 102 of the image processing apparatus 100 then converts the data that has been read by the CCD 231 into image data in the form of digital signals, and after performing image processing for scanning, stores the processed image data into the memory 105 in the controller 102. The image data represents an RGB color space constituted by three image signals, each pixel holding an 8-bit (256 gray levels) value for each image signal.

For setting and reading an original in the DF 202, a user places the original face up on the tray of an original set unit 203 in the DF 202. Then, an original sensor 204 detects that the original has been placed, and as a result, an original feed roller 205 and a conveyor belt 206 convey the original while rotating so that the original is set in a predetermined position on the original platen 207. After this, image data is read in the same manner as in the case of reading an original on the original platen 207, and the obtained image data is stored into the memory 105 in the controller 102. After completion of the reading, the conveyor belt 206 rotates again and thereby conveys the original to the right in the cross-sectional view of the image processing apparatus 100 in FIGS. 2A to 2C, whereby the original is ejected to an original paper output tray 209 via a conveyor roller 208 that is provided on a paper ejection side. If there are multiple originals, an original is ejected and conveyed from the original platen 207 to the right in the cross-sectional view of the image processing apparatus 100.

At the same time, the next original is fed and conveyed via the paper feed roller 205 from the left in the cross-sectional view of the image processing apparatus 100, so that the next original is read consecutively. The above described is the operation of the scanner unit 101.

Next described is a rasterizing operation for the PRINT function, which is mainly performed by the PC 108. Print data such as PDL (Page Description Language) data or a display list is transmitted from a PC via the network 106. The print data is vector information that includes, in addition to information such as colors and shapes for rendering and coordinates, data that indicates the attributes of objects such as characters, lines, graphics, and images on an object-by-object basis. The controller 102 receives the print data and performs rasterization based on the print data so as to generate image data and attribute data pixel by pixel. The print data represents a color space constituted by multiple image signals, such as grayscale, RGB, or CMYK, whereas the image data includes an 8-bit (256 gray levels) pixel value for each image signal. The attribute data includes a value that indicates the attribute of any of the above-described objects such as characters, lines, graphics, and images, and the attribute data is handled together with the image data in an image processing unit 301.

Subsequently described is a printing operation for the COPY and PRINT functions, which is mainly performed by the printer unit 103. The image data and the attribute data that have been temporarily stored in the memory 105 in the controller 102 are transferred again to the printer unit 103 after having been subjected to image processing for printing as described later in the controller 102. In the printer unit 103, the data is converted into pulse signals with PWM control in the printer unit 103, and further converted by a laser recording unit into four-color recording laser beams of the colors cyan (C), magenta (M), yellow (Y), and black (K). The recording laser beams are then emitted to photosensitive members 214 of the respective colors so as to form an electrostatic latent image on the photosensitive members. The printer unit 103 then performs toner development on the photosensitive members using the toner supplied from toner cartridges 215, and toner images visualized on the photosensitive members undergo primary transfer to an intermediate transfer belt 219. The intermediate transfer belt 219 rotates clockwise in FIGS. 2A to 2C, so that the toner images are transferred from the intermediate transfer belt 219 onto recording paper as the recording paper that is fed from a paper cassette 216 along a paper feed conveyance path 217 reaches a secondary transfer position 218.

The image-transferred recording paper is moved to a fuser 220 where the toner is fused in place by pressure and heat, then conveyed along a paper-ejection conveyance path, and thereafter ejected to either a face-down center tray 221 or a face-up side tray 222. A flapper 223 is provided to switch conveyance paths in order to switch between the paper ejection ports. For double-sided printing, after recording paper has passed the fuser 220, the flapper 223 switches conveyance paths and then switches them back so that the recording paper is transmitted downward and fed back again to the secondary transfer position 218 along a double-sided printing paper conveyance path 225, which accomplishes double-sided printing.

Example Configuration and Image Processing
According to Embodiment of Present Invention Next, the abovementioned image processing for printing will be described in detail with reference to FIG. 3A.

Figure 3A:
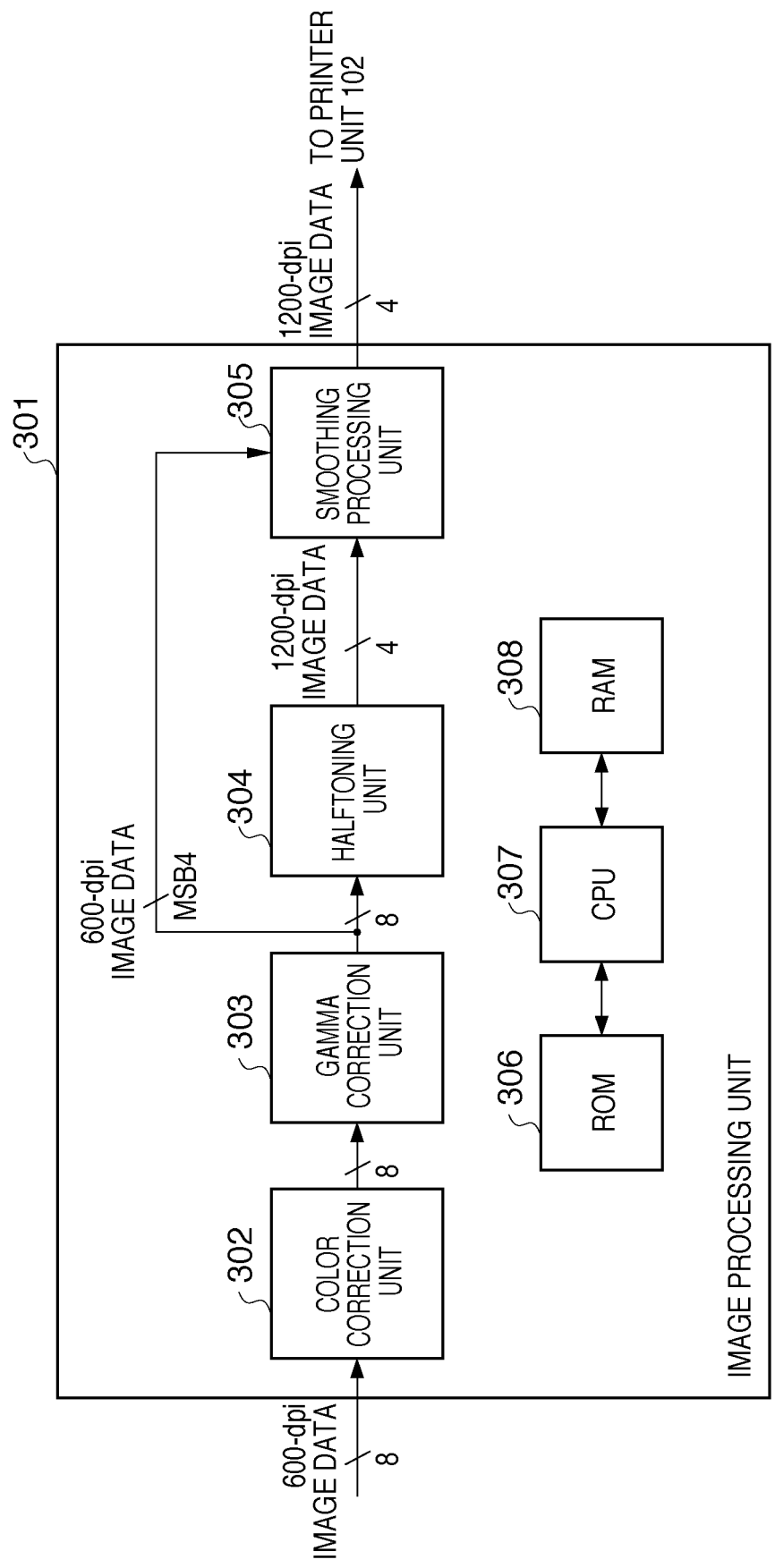
FIG. 3A is a block diagram of image processing for printing according to an embodiment of the present invention.

In FIG. 3A, the reference numeral 301 denotes an image processing unit that performs image processing for printing in the controller 102. Referring to the image data and the attribute data that have been input from the memory 105, the image data is subjected to color correction processing by a color correction unit 302 and then converted by a color conversion LUT or matrix computation into a CMYK color space having a density constituted by four image signals. The converted image data hold an 8-bit pixel value for each image signal. Then, through gamma correction processing by a gamma correction unit 303 and digital halftoning through dithering or an error diffusion process by a halftoning unit 304, the image data is converted from an 8-bit pixel value to a 4-bit pixel value that is printable by the printer unit 103. At this time, the digital halftoning by the halftoning unit 304 is performed on image data that has been subjected to resolution conversion processing in which input image data with 600 dpi resolution is converted into image data with 1200 dpi resolution. The resolution conversion processing as referred to herein is performed using a known technique such as nearest-neighbor, bilinear, or bicubic conversion, so it will not be described herein in detail. Thereafter, a smoothing processing unit 305 performs smoothing processing as described later, using the image data immediately before being input into the halftoning unit 304 (first image data) and the image data that has been output from the halftoning unit 304 (second image data). The smoothed image data that has a 4-bit pixel value for each image signal is sent out to the printer unit 103. The reference numeral 307 denotes a CPU that operates as an image processing computer and controls the operation of the entire image processing unit 301 according to a control program held in a ROM 306. The reference numeral 308 denotes a RAM that is used as a work area of the CPU 307.

Note that, in the description of the embodiment according to the present invention, the halftoning unit 304 performs digital halftoning after image data is converted from 600 dpi to 1200 dpi by the resolution conversion processing. However, the present invention is not limited thereto, and for example, the digital halftoning may be performed without performing the resolution conversion processing and with the same resolution as contone (an abbreviation for "continuous tone") image data. In that case, it is apparent that in further processing, halftone image data is processed not in units of a rectangular region but on a pixel-by-pixel basis.

Figure 3B:
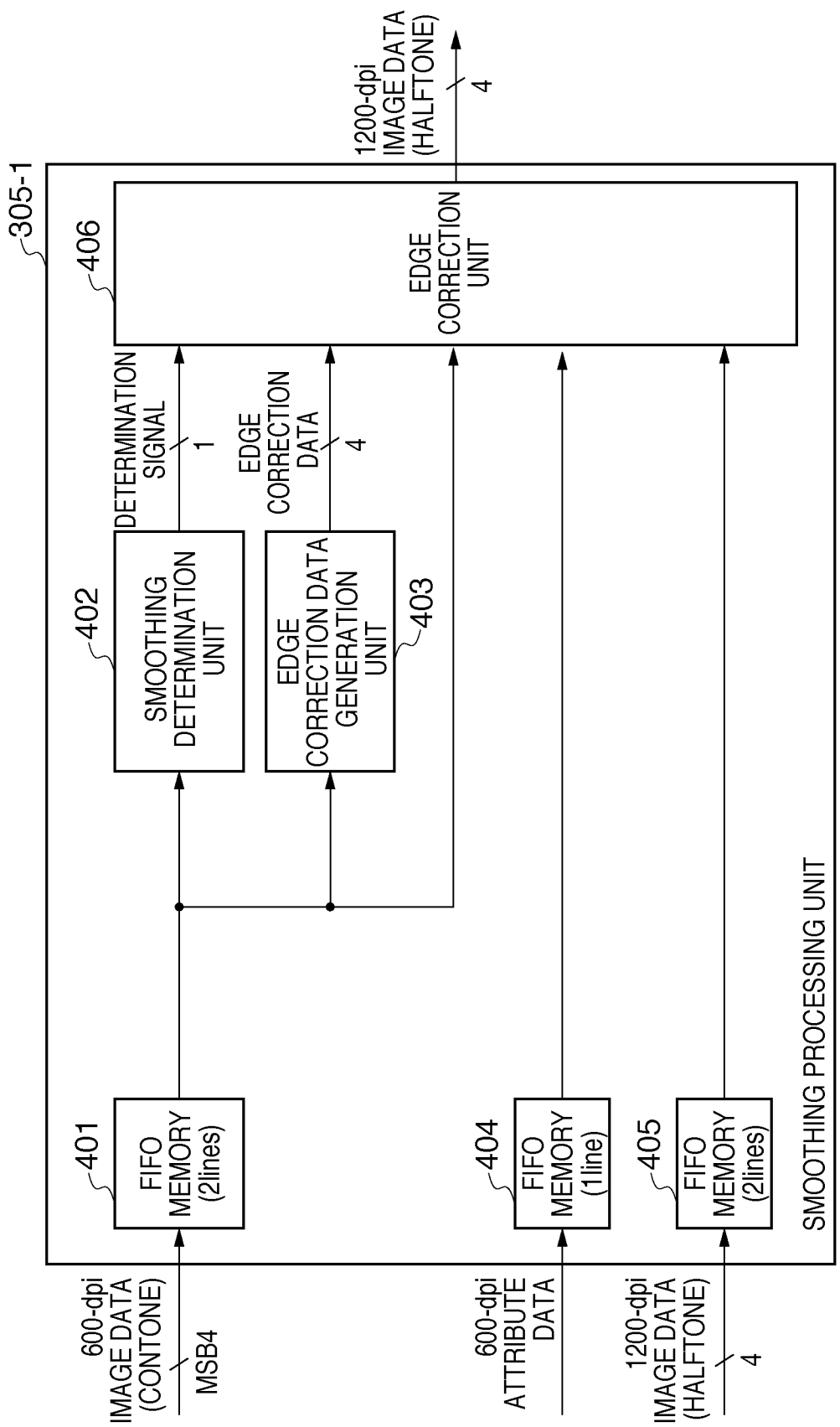
FIG. 3B is block diagram of a smoothing processing unit according to a first embodiment.

Example Configuration and Processing by
Smoothing Processing Unit 305-1 of First
Embodiment Next, the operation of a smoothing processing unit 305-1 according to a first embodiment will be described with reference to FIG. 3B. The smoothing processing unit 305-1 in FIG. 3A inputs the (contone) image data immediately before being input into the halftoning unit 304, the (halftone) image data output from the halftoning unit 304, and the attribute data. As described above, the contone image data has a 600 dpi resolution, and the halftone image data has a 1200 dpi resolution. The attribute data is input with the same resolution as the contone image data, for example, a 600 dpi resolution. In FIG. 3B, the attribute data handled together with the image data is shown for explanation.

The contone image data is accumulated in a FIFO memory 401 in the smoothing processing unit 305-1. At this time, in the contone image data, only the 4 most significant bits of the 8 bits for each image signal are input into the smoothing processing unit 305-1. The FIFO memory 401 delays the contone image data by two lines, forms a 3-by-3 pixel reference area that is constituted by 9 pixels centered on a pixel of interest, and outputs the reference area to a smoothing determination unit 402 and an edge correction data generation unit 403. Also, only a single pixel at the center (pixel of interest) in the reference area is output to an edge correction unit 406. Then, the smoothing determination unit 402 performs smoothing determination processing for determining whether or not to perform smoothing processing according to the reference area, and outputs the determination result as a determination signal to the edge correction unit 406. The edge correction data generation unit 403 performs edge correction data generation processing so as to obtain edge correction data for use in edge correction processing as described later from the reference area, and outputs the edge correction data to the edge correction unit 406.

Similarly to the above-described contone image data, the attribute data is accumulated in a FIFO memory 404. The FIFO memory 404 delays the attribute data by one line, and outputs a single pixel of data to the next edge correction unit 406 to match the timing of the pixel of interest in the reference area.

The halftone image data is converted by the halftoning unit 304 into a 4-bit signal with 1200 dpi resolution and is further output as a 2-by-2 pixel rectangular region that is four times the size of a single 600 dpi pixel, to the smoothing processing unit 305-1. A FIFO memory 405 delays the above-described rectangular region of 1200 dpi image data and outputs the 1200 dpi rectangular region, for example, four pixels, to the edge correction unit 406 to match the timing of the contone image data and the attribute data.

The edge correction unit 406 performs edge correction processing as described later using the above-described five pieces of data and outputs a rectangular region constituted by four 4-bit pixels of halftone image data.

Example Processing by Smoothing Determination Unit 402

Next, the smoothing determination processing by the smoothing determination unit 402 according to the present embodiment will be described in detail with reference to FIG. 4A. Note that the smoothing determination unit 402 performs similar smoothing determination processing for each CMYK image signal and outputs a determination signal for each of the image signals. While the processing by the smoothing determination unit 402 may be implemented by either hardware or software, in the present embodiment, it will be described as computer processing performed by a CPU according to a program.

Figure 4A:
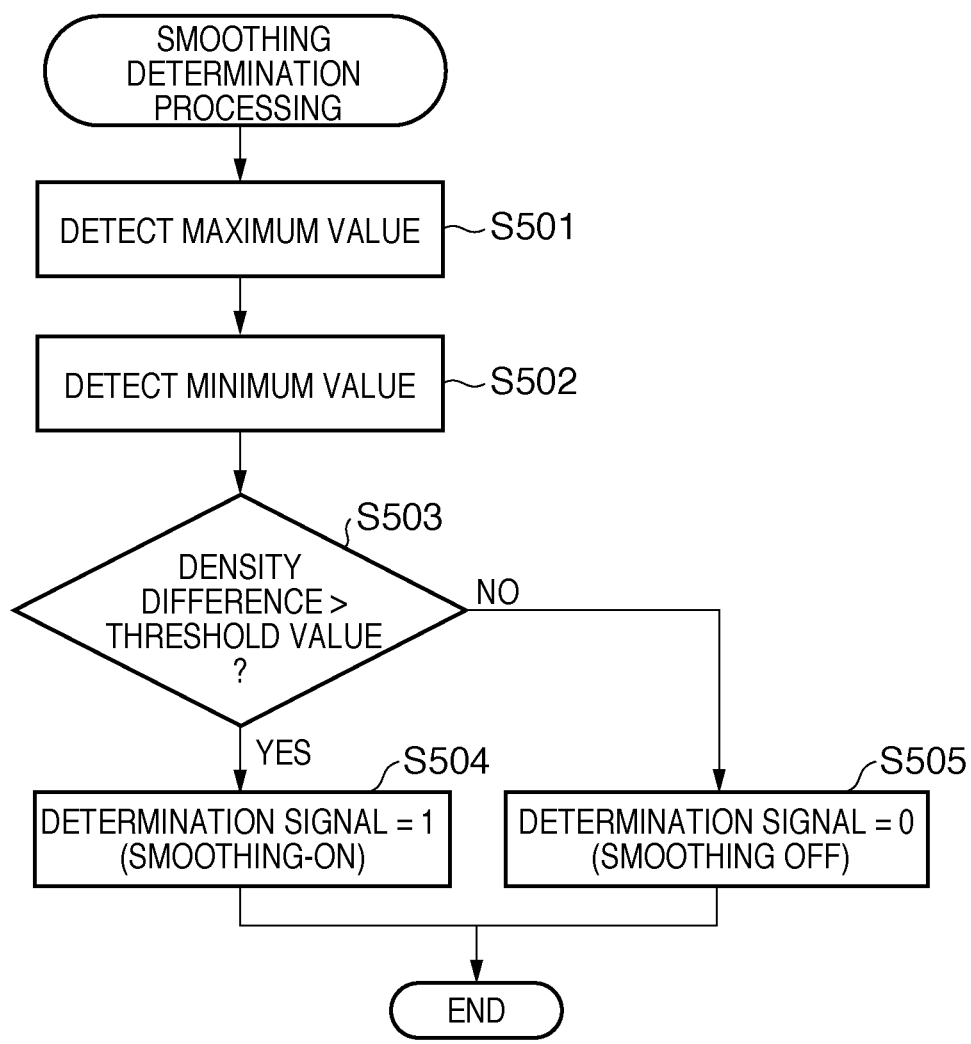
FIG. 4A is a flow chart of smoothing determination processing according to the first embodiment.

Referring to FIG. 4A, first in step S501, the CPU of the smoothing determination unit 402 detects a maximum pixel value from nine pixels in the input reference area. Then, in step S502, the CPU of the smoothing determination unit 402 detects a minimum pixel value from the nine pixels in the input reference area. Then, in step S503, the density difference obtained by subtracting the minimum value from the maximum value is compared with a predetermined threshold value Zsub, and if the density difference is higher than the threshold value Zsub, the process proceeds to step S504. Then, in step S504, the value of "1" is output as a determination signal OutDataZ. If the density difference is equal to or lower than the threshold value Zsub in step S503, the process proceeds to step S505, in which the value of "0" is output as the determination signal OutDataZ.

Example Processing by Edge Correction Data Generation Unit 403

Next, the edge correction data generation processing by the edge correction data generation unit 403 will be described in detail with reference to FIGS. 4B, 5A, and 5B. Note that the edge correction data generation unit 403 also performs similar edge correction data generation processing for each CMYK image signal and outputs edge correction data for each of the image signals. While the processing by the edge correction data generation unit 403 may be implemented by either hardware or software, in the present embodiment, it will be described as computer processing performed by a CPU according to a program.

Figure 4B:
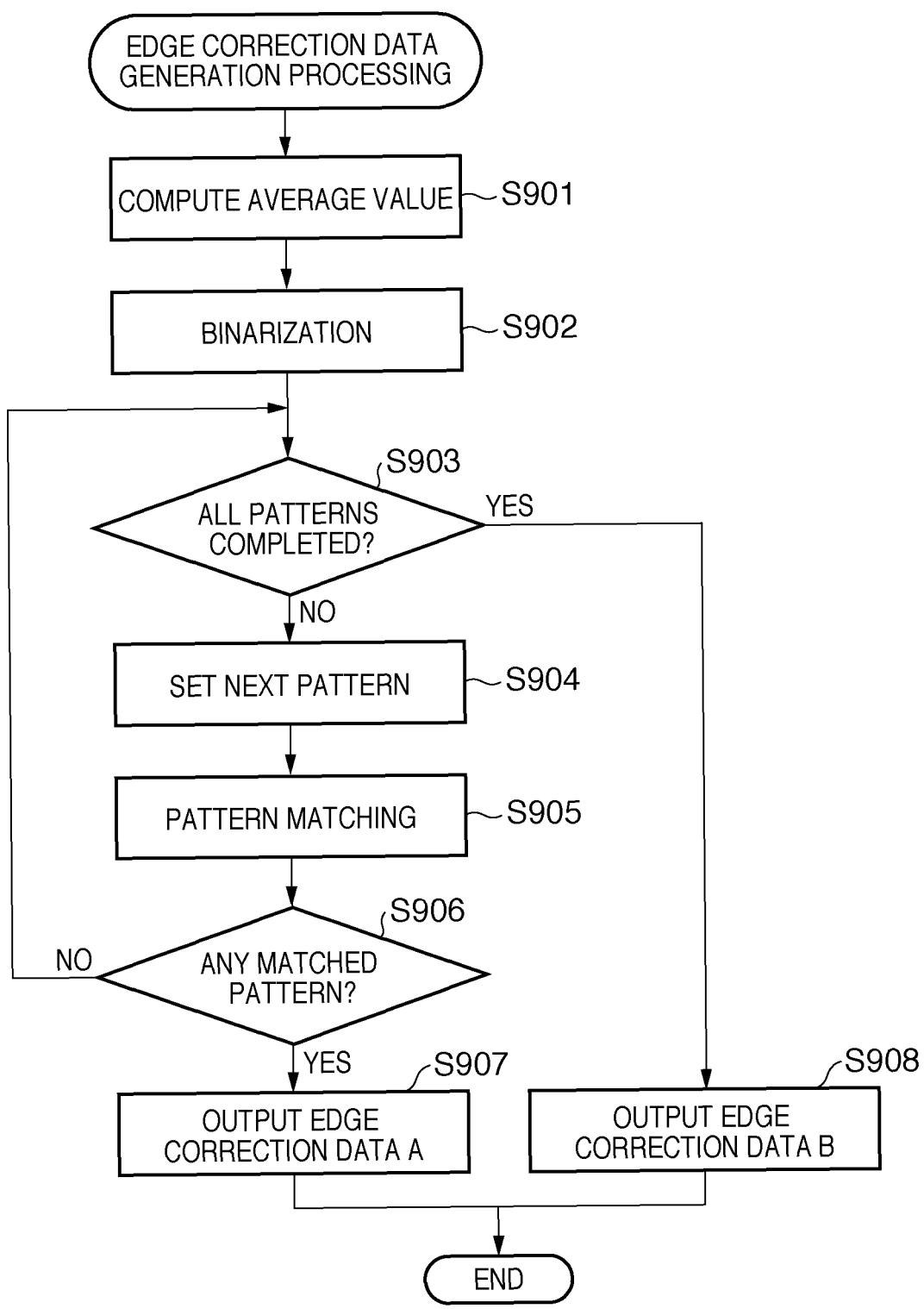
FIG. 4B is a flow chart of edge correction data generation processing according to the first embodiment.

Referring to FIG. 4B, first, in step S901, the CPU of the edge correction data generation unit 403 obtains an average value for the nine pixels in the input reference area. Note that, in the present embodiment, an average value is obtained as a result of the following equation (1) in order to avoid division.

$$\text{If}(SUM > 120), SUM = 120, AVE = (SUM \gg 3) \quad (1)$$

That is, a sum total SUM of the nine pixel values in the above-described reference area is clipped to 120 and shifted by 3 bits to the right (divided by eight) so that an average value AVE is obtained without division. It is apparent that the sum total SUM of the nine pixel values may be divided by nine to obtain an average value. Then, in step S902, the CPU of the edge correction data generation unit 403 binarizes the reference area by comparing all of the nine pixel values in the input reference area with a predetermined threshold value threSST. In the binarization, if a pixel value is higher than the threshold value threSST, it is set to "1", whereas if the pixel value is equal to or lower than the threshold value threSST, it is set to "0". Then, in step S903, it is determined whether or not the comparison in the pattern matching in step S905 has been completed for all edge patterns, and if the comparison has not been completed, the process proceeds to step S904.

Figure 5A:
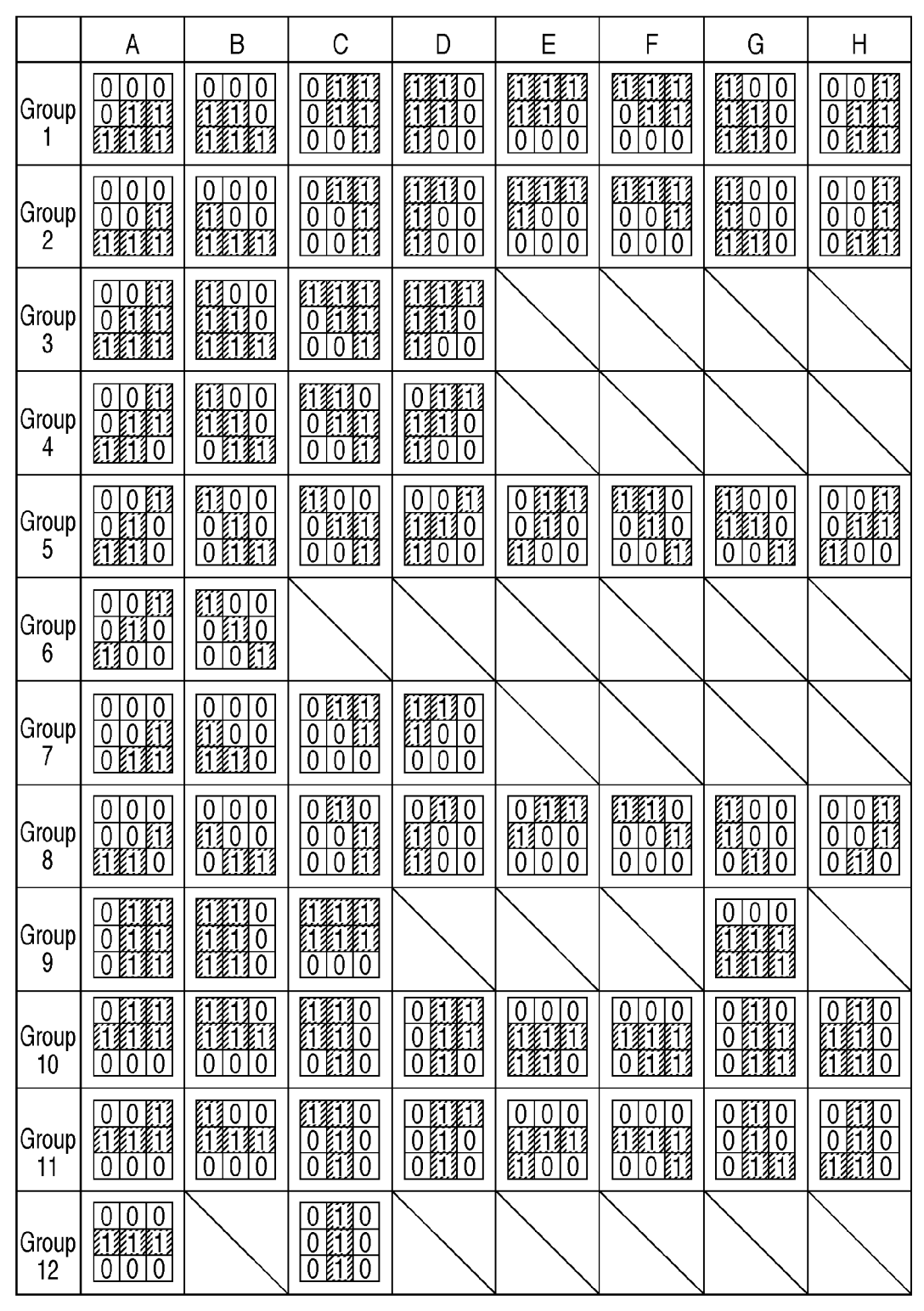
Figure 5B:
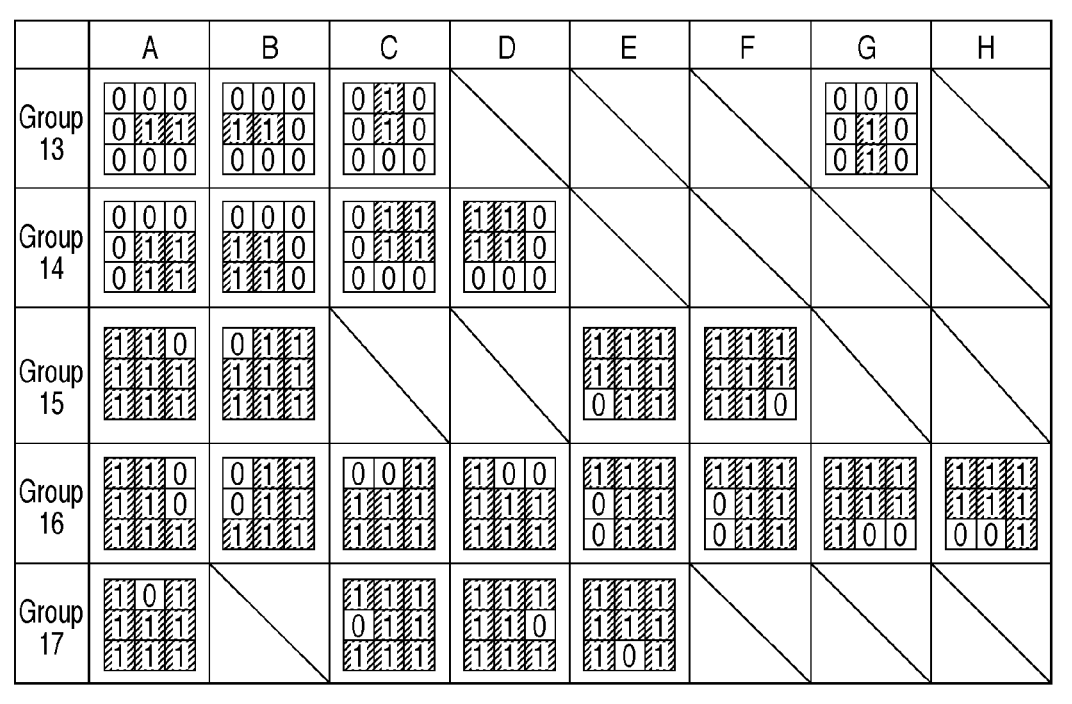

The abovementioned edge patterns are classified into 17 groups as illustrated in FIGS. 5A and 5B, each group consisting of eight types of edge patterns A to H. The edge patterns in the same group have the same configuration, either inverted or rotated, and duplicate edge patterns obtained as a result of either inversion or rotation are eliminated from the groups. Each edge pattern has a 3-by-3 pixel size with each pixel having a value of either "0" or "1".

Then, in step S904, the next edge pattern for use in pattern matching is set, and the process proceeds to step S905. The edge patterns are set in sequential ascending order from group 1, and the edge patterns in the same group are set in sequential order from A to H. Additionally, it is not always necessary to use all of the edge patterns illustrated in FIGS. 5A and 5B, and whether or not to set an edge pattern or a group may be determined arbitrarily for each edge pattern or for each group. An edge pattern or a group that has been determined as not to be set will not be set in step S904, and the next edge pattern or the next group is set. Then, in step S905, pattern matching is performed using the binarized reference area and the set edge pattern. In the pattern matching, it is determined whether or not the nine pixel values in the binarized reference area all match the nine pixel values in the set edge pattern. Then, in step S906, if the binarized reference area and the set edge pattern are matched in the pattern matching in step S905, the process proceeds to step S907. If they are mismatched, the process returns to step S903.

Then, in step S907, the CPU of the edge correction data generation unit 403 generates and outputs edge correction data A as the edge correction data. The edge correction data A is a value obtained by modulating the average value AVE obtained in step S901, using a one-dimensional look-up table LUTSST. If the comparison with all edge patterns has been completed in step S903, the process proceeds to step S908. Then, in step S908, the CPU of the edge correction data generation unit 403 generates and outputs edge correction data B as the edge correction data. The edge correction data B is a value obtained by modulating the average value AVE obtained in step S901, using a one-dimensional look-up table LUTE.

Figures 17, 18A, 18B, 18C:
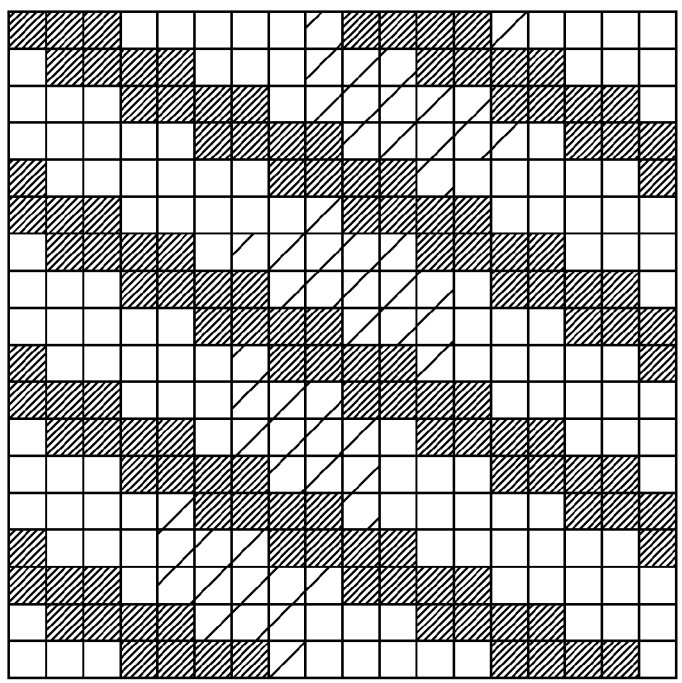
FIG. 17 illustrates an example of the result of conventional smoothing processing.
FIGS. 18A to 18C illustrate examples of a one-dimensional look-up table according to the first embodiment.

Here, the abovementioned LUTSST and LUTE are 4-bit input and 4-bit output look-up tables, and they are set to have linear characteristics so that an input value is basically output as it is. It is, however, also possible to set those tables to provide non-linear outputs according to the properties of a printer, for example. FIGS. 18A to 18C illustrate examples of the look-up tables LUTSST and LUTE. FIG. 18A illustrates a one-dimensional look-up table having the above-described linear characteristics, for example, the input values and the output values are set to the same values as described above. FIGS. 18B and 18C illustrate examples of a one-dimensional look-up table having non-linear characteristics. The look-up table in FIG. 18B has lower output values than input values and thus is used in cases such as where a printer has darker tone characteristics than usual or for reducing the effect of edge smoothing. The look-up table in FIG. 18C has higher output values than input values and thus is used in cases such as where a printer has lighter tone characteristics than usual or for enhancing the effect of edge smoothing. It is also possible to have multiple look-up tables LUTSST, in which case a look-up table LUTSST may be held for each edge pattern for use in the pattern matching in step S905 or for each group so as to be switched or used according to the edge pattern that has been matched in step S905. The processing from steps S903 to S906 is not necessarily performed in sequence, and it is apparent that all or part of the pattern matching using edge patterns may be performed in parallel.

Example Processing by Edge Correction Unit 406

Next, the edge correction processing by the edge correction unit 406 will be described in detail with reference to FIGS. 6A and 6B. Note that the edge correction unit 406 also performs similar edge correction processing for each CMYK image signal. While the processing by the edge correction unit 406 may be implemented by either hardware or software, in the present embodiment, it will be described as computer processing performed by a CPU according to a program.

Figure 6A:
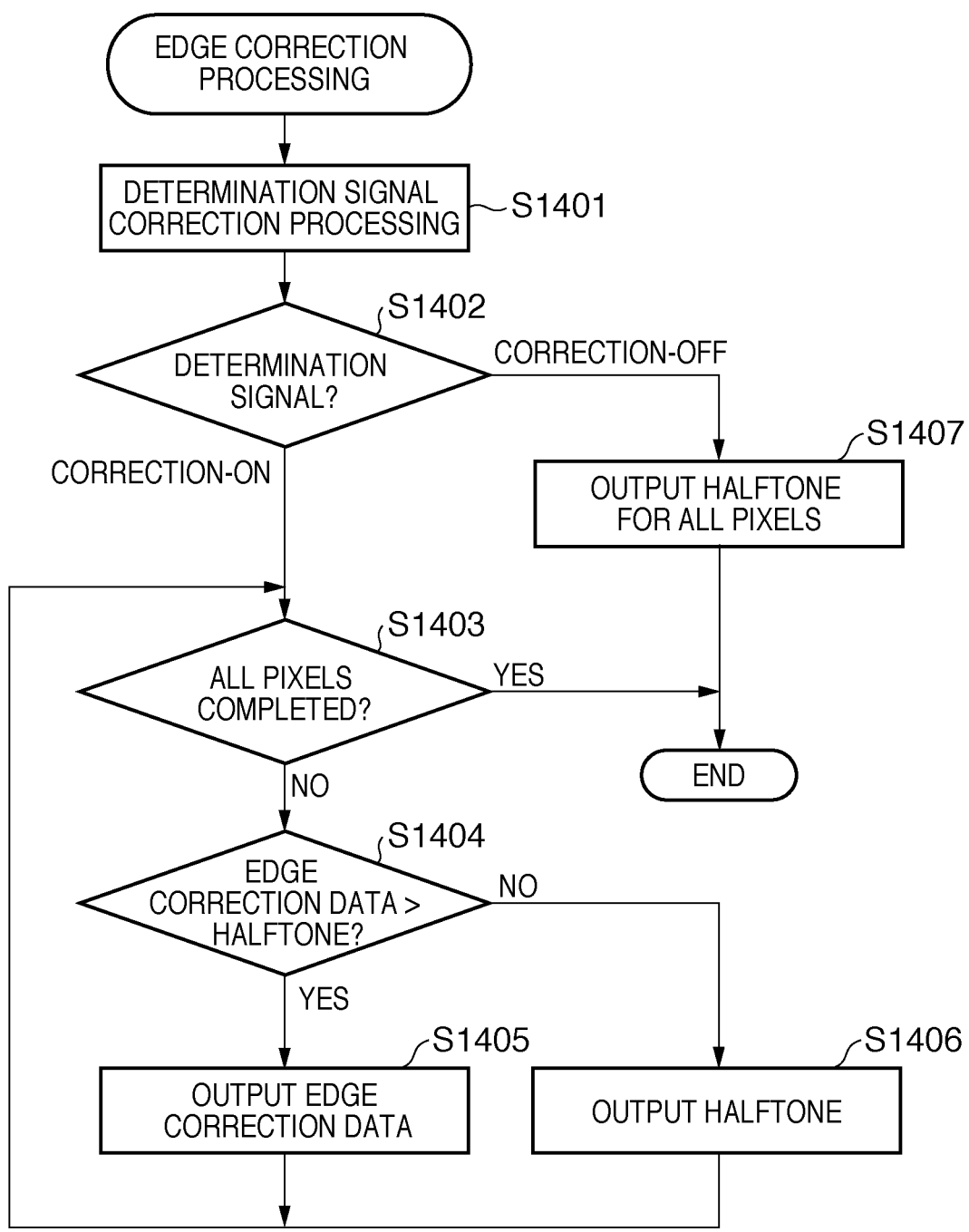
FIG. 6A is a flow chart of edge correction processing according to the first embodiment.

Referring to FIG. 6A, first in step S1401, the CPU of the edge correction unit 406 performs determination signal correction processing as described later so as to correct the determination signal OutDataZ, and then the process proceeds to step S1402. In step S1402, if the corrected determination signal OutDataZ is "1" (correction-on), the process proceeds to step S1403. In step S1403, it is determined whether or not output data as described below has been selected for all four pixels in the rectangular region of halftone image data, and if there are any pixels whose output data has not been selected, the process proceeds to step S1404. Or, if the output data has been selected for all of the pixels, the edge correction processing is completed.

Then, in step S1404, the halftone image data for the pixel whose output data has not been selected and the edge correction data generated by the edge correction data generation unit 403 are compared in value. If the comparison result shows that the edge correction data has a higher value, the process proceeds to step S1405, in which the edge correction data is output to the pixel location in the compared halftone image data. Or, if the comparison result shows that the pixel value is equal to or higher than the edge correction data, the process proceeds to step S1406, in which the pixel in the compared halftone image data is output.

Also, if the corrected determination signal OutDataZ is "0" (correction-off) in step 1402, the process proceeds to step S1407, in which the rectangular region of halftone image data is output.

Determination Signal Correction Processing S1401

Next, the determination signal correction processing in step S1401 in FIG. 6A will be described in detail.

First, in step S1501, it is determined whether the determination signal OutDataZ is "1" (correction-on) or "0" (correction-off), and if the signal is "correction-on", the process proceeds to step S1502. If the determination signal OutDataZ is "correction-off" in step S1501, the process proceeds to step S1506.

Then, the attribute data is determined in step S1502. As described above, the attribute data is single-pixel data with 600 dpi resolution and includes a value that indicates the attribute of an object such as a character, a line, a graphic, and an image, and additionally a value that indicates the type of functions such as COPY and PRINT. In step S1502, whether or not to correct the determination signal OutDataZ is determined based on the attribute data. In the present embodiment, smoothing processing is performed on only characters, lines, and graphics for the PRINT function by way of example, so that in the case where the attribute data has a value that indicates any of those objects, the process proceeds to step S1503. If the attribute data indicates an attribute other than those of characters, lines, and graphics for the PRINT function in step S1502, the process proceeds to step S1506. That is, if the attribute data has a value that indicates the attribute or operation of an object other than those described above, the process proceeds to step S1506.

Then, in step S1503, white pixel determination is performed for determining whether or not the pixel of interest in the contone image data is a white pixel. The white pixel as referred to herein is a white-color pixel, for example, a pixel that has a value of 0 for all CMYK image signals. Then, in step S1504, it is determined whether or not the pixel of interest is a white pixel and whether or not the attribute data indicates a white pixel determination attribute. The white pixel determination attribute as referred to herein is the attribute of an object that is referred to at the time of white pixel determination, and in the present embodiment, the attributes of characters and lines are defined as white pixel determination attributes, for example. Accordingly, if the attribute data indicates the attribute of either a character or a line and if the pixel of interest is a white pixel, the process proceeds to step S1506. If the pixel of interest is not a white pixel and/or if the attribute data does not indicate a white pixel determination attribute, the process proceeds to step S1505. Then, in step S1505, the value of "1" (correction-on) is output as the determination signal OutDataZ. In step S1506, the value of "0" (correction-off) is output as the determination signal OutDataZ.

In this way, since the determination signal generated from the density by the smoothing determination unit 402 is corrected according to the attribute of each object, it is possible to prevent adverse effects from being given to objects such as natural images that do not necessitate smoothing processing. In addition, since the determination signal is set to "correction-off" for white pixels of characters or lines, it is also possible to eliminate adverse effects such as outline characters or outline lines being narrowed.

Note that the present embodiment has described that the white pixel represents a pixel that has a value of "0" for all CMYK image signals. However, the present invention is not limited thereto, and it is, for example, apparent that a pixel that has a value lower than a predetermined threshold value and is regarded as white accordingly may be determined as a white pixel. Moreover, examples of the attribute indicated by the above-described attribute data are not limited to those of characters, lines, graphics, and images, and they may include, for example, an attribute that indicates small characters with a point size of 4 or less, or an attribute that indicates thin lines with a point size of 0.1 or less.

In the above description, separate CPUs are provided for the processes performed by the smoothing determination unit 402, the edge correction data generation unit 403, and the edge correction unit 406. However, those processes may be performed by the CPU of the smoothing processing unit 305-1 or by the CPU 307 of the image processing unit 301.

Specific Example of Processing by Smoothing Processing Unit 305-1

Next, the operation of the smoothing processing unit 305-1 will be described specifically with reference to FIGS. 7A to 9D. Note that, for simplicity of explanation, the operation for black (K) in image data constituted by four CMYK image signals will be described by way of example.

Specific Example 1

Figure 7A:
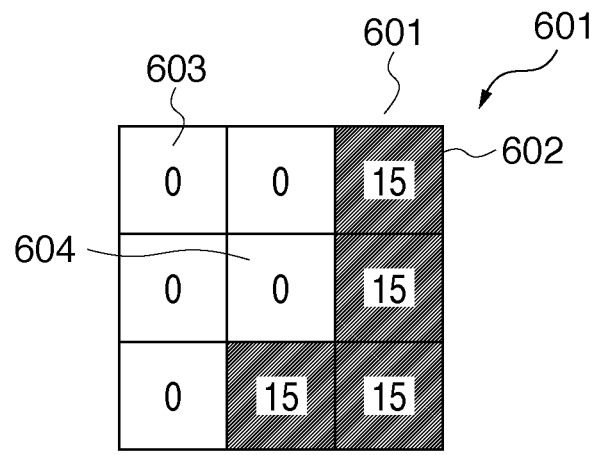
FIGS. 7A to 7D illustrate a specific example of processing by the smoothing processing unit according to the first embodiment.

In the case where a reference area 601 illustrated in FIG. 7A is input into the smoothing determination unit 402, the pixel value "15" of pixels 602 is obtained as a maximum value in step S501 and the pixel value "0" of pixels 603 is obtained as a minimum value in step S502. Then, in step S503, the density difference therebetween, "15", is compared with the threshold value Zsub. In the present embodiment, the threshold value Zsub is assumed to be "4", so that the density difference in the reference area 601 is higher than the threshold value Zsub, and accordingly, the value of "1" is output into the edge correction unit 406 as the determination signal OutDataZ for the reference area 601.

Figure 7B:
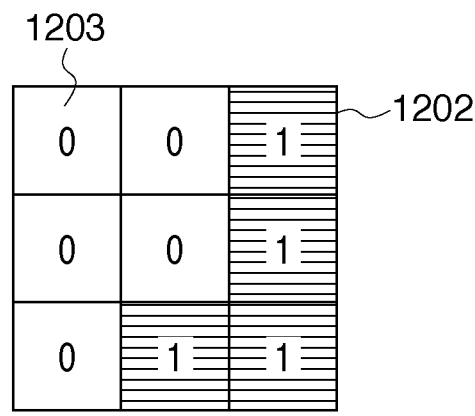

The reference area 601 is also input into the edge correction data generation unit 403, so that an average value AVE of "7" is obtained in step S901 and a binarized reference area 1201 illustrated in FIG. 7B is obtained in step S902. Here, in the present embodiment, the threshold value threSST is assumed to be "8". Since the pixels 602 in the reference area 601 have the value of "15" that is higher than the threshold value threSST, they are binarized into "1" as pixels 1202, whereas, since the pixels 603 have the value of "0" that is lower than the threshold value threSST, they are binarized into "0" as pixels 1203. The binarized reference area 1201 in FIG. 7B matches with edge pattern H in group 2 in FIGS. 5A and 5B in steps S903 to S906, so that the value of "7" is output as edge correction data into the edge correction unit 406 in step S907.

Figure 7C:
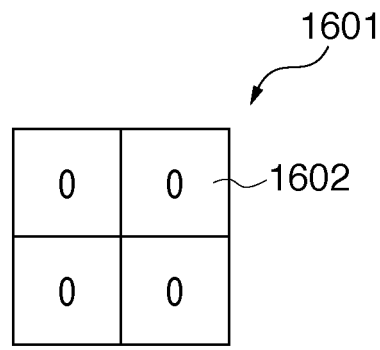
Figure 7D:
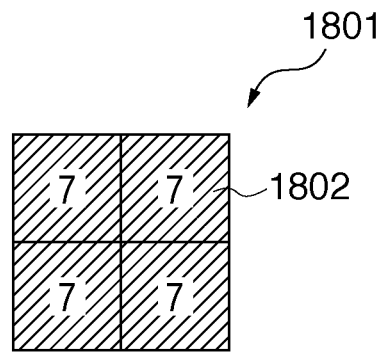

The edge correction unit 406 inputs, in addition to the above-described determination signal and the above-described edge correction data, a pixel of interest 604 in the reference area 601, attribute data that corresponds to the reference area 601, and a rectangular region 1601 illustrated in FIG. 7C. The attribute data corresponding to the reference area 601 is a value that indicates an image. The edge correction unit 406 performs the determination signal correction processing in step S1401 so that the determination signal is set to "correction-on". Then, in steps S1403 to S1406, each pixel value in the rectangular region 1601 is compared with the value "7" of the edge correction data, and a rectangular region 1801 illustrated in FIG. 7D is output as a result.

Specific Example 2

Figure 8A:
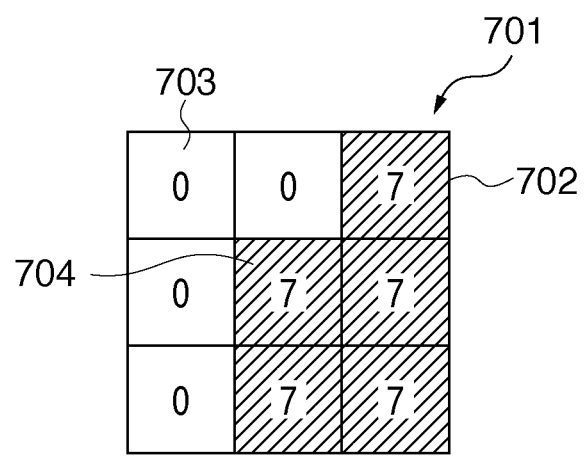
FIGS. 8A to 8D illustrate another specific example of processing by the smoothing processing unit according to the first embodiment.
Figure 8B:
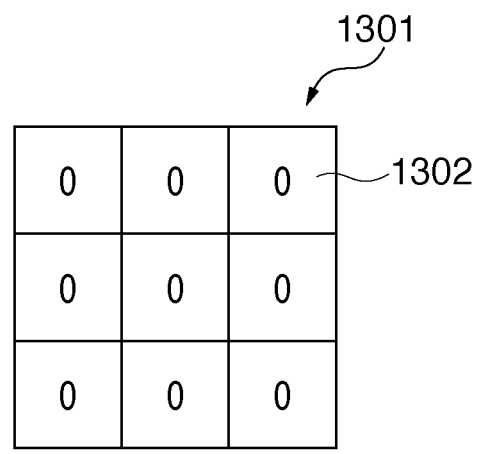

Similarly, in the case where a reference area 701 illustrated in FIG. 8A is input into the smoothing determination unit 402, a maximum value is the pixel value "7" of pixels 702 and a minimum value is the pixel value "0" of pixels 703. Thus, the density difference "7" therebetween and the threshold value Zsub are compared, so that the determination signal OutDataZ is set to "1". Meanwhile, the edge correction data generation unit 403 obtains an average value AVE of "4", and since all of the pixels in the reference area 701 are lower than the threshold value threSST, they are binarized into "0" so that a reference area 1301 illustrated in FIG. 8B is obtained. Then, since the binarized reference area 1301 illustrated in FIG. 8B does not match any of the edge patterns in FIGS. 5A and 5B, the value of "4" is output as the edge correction data in step S908.

Figure 8C:
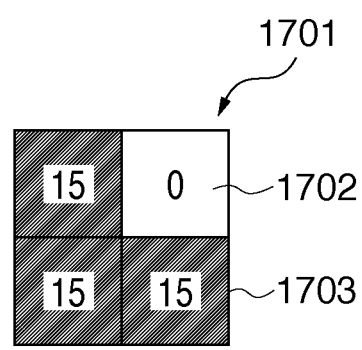
Figure 8D:
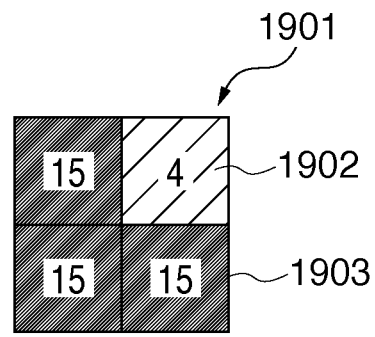

The edge correction unit 406 inputs, in addition to the above-described determination signal and the above-described edge correction data, a pixel of interest 704 in the reference area 701, attribute data that corresponds to the reference area 701, and a rectangular region 1701 illustrated in FIG. 8C. The attribute data corresponding to the reference area 701 is a value that indicates a graphic. In the edge correction unit 406, the determination signal is set to "correction-on", each pixel value in the rectangular region 1701 is compared with the value "4" of the edge correction data, and a rectangular region 1901 illustrated in FIG. 8D is output as a result.

Specific Example 3

Figure 9A:
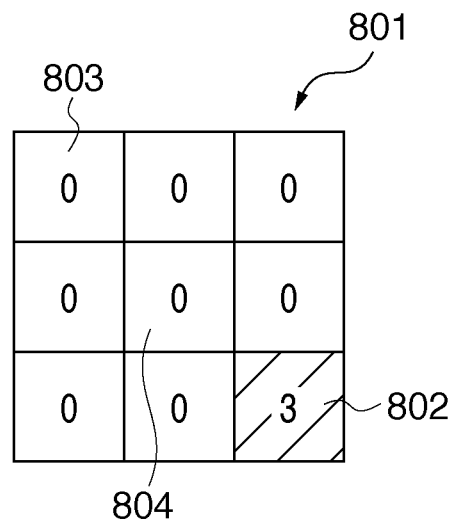
FIGS. 9A to 9D illustrate still another specific example of processing by the smoothing processing unit according to the first embodiment.
Figure 9B:
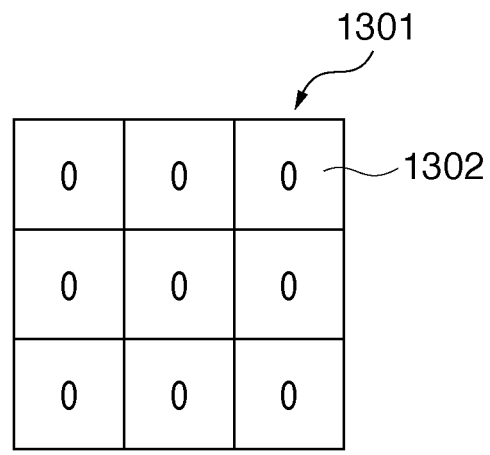

Also, for example in the case where a reference area 801 illustrated in FIG. 9A is input into the smoothing determination unit 402, a maximum value is the pixel value "3" of a pixel 802 and a minimum value is the pixel value "0" of pixels 803. Thus, as a result of the comparison between the density difference "3" therebetween and the threshold value Zsub, the determination signal OutDataZ is set to "0". Meanwhile, the edge correction data generation unit 403 obtains an average value AVE of "0". Since all of the pixels in the reference area 801 have lower values than the threshold value threSST, a reference area 1301 with all pixels being binarized into "0" as illustrated in FIG. 9B is obtained, and the value of "0" is output as edge correction data in step S908.

Figure 9C:
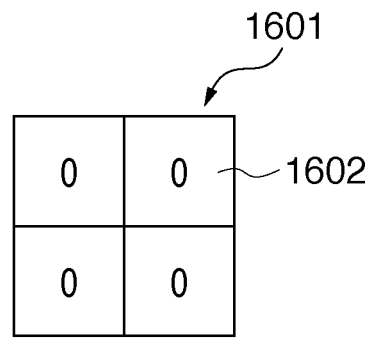
Figure 9D:
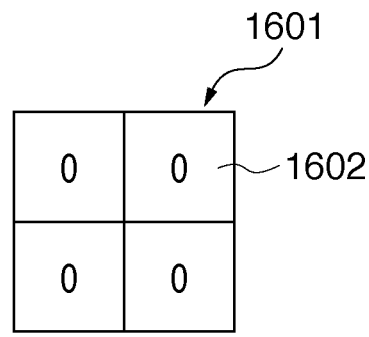

The edge correction unit 406 inputs, in addition to the above-described determination signal and the above-described edge correction data, a pixel of interest 804 in the reference area 801, attribute data that corresponds to the reference area 801, and a rectangular region 1601 illustrated in FIG. 9C. The attribute data corresponding to the reference area 801 is a value that indicates an image. In the edge correction unit 406, since the determination signal is "correction-off", a rectangular region 1601 illustrated in FIG. 9D is output as a result.

In the present embodiment, while the threshold value Zsub is assumed to be "4" and the threshold value threSST is assumed to be "8", they may be set to any arbitrary values that allow the range of application of smoothing processing to be controlled.

Specific Example of Edge Processing According to Present Embodiment

Now, a specific example of edge processing by the smoothing processing unit 305-1 will be described with reference to FIGS. 10A to 12B. Here, for simplicity of explanation, the operation for black (K), output image data constituted by four CMYK image signals, is described by way of example.

Edge Processing Example 1

FIG. 10A illustrates image data constituted by pixels 2001 and pixels 2002, the pixels 2001 having a pixel value of "0" for K, and the pixels 2002 having a pixel value of "255" for K. In attribute data, the pixels 2001 correspond to pixels 2101 in FIG. 10B and the pixels 2002 correspond to pixels 2102 in FIG. 10B. The pixels 2101 have the attribute (I) of images, whereas the pixels 2102 have the attribute (G) of graphics. The pixels 2001 in FIG. 10A are converted by digital halftoning by the halftoning unit 304 into pixels 2201 having a pixel value of "0" for K as illustrated in FIG. 10C, whereas the pixels 2002 are converted into pixel 2202 having a pixel value of "15" for K.

FIG. 10D illustrates halftone image data obtained as a result of performing the smoothing processing according to the present embodiment on the contone image data in FIG. 10A, the attribute data in FIG. 10B, and the halftone image data in FIG. 10C. It can be seen that light-color pixels 2301 and pixels 2302 are added to the boundaries between the pixels 2001 and the pixels 2002, for example, edge portions, so as to make the edge portions smooth.

Edge Processing Example 2

Figure 11A:
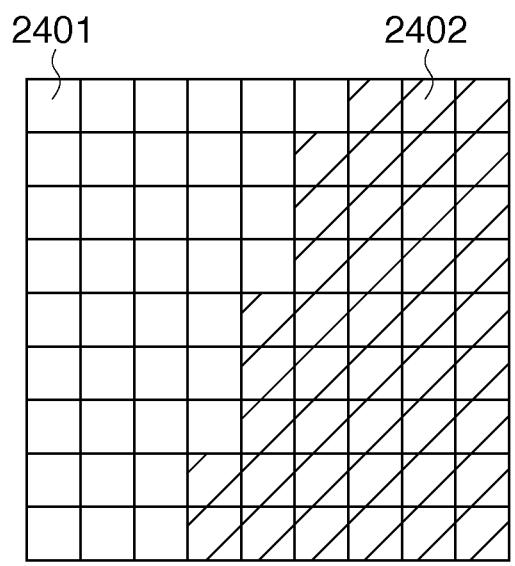
FIG. 11A is a second example of contone image data according to the first embodiment.
Figure 11B:
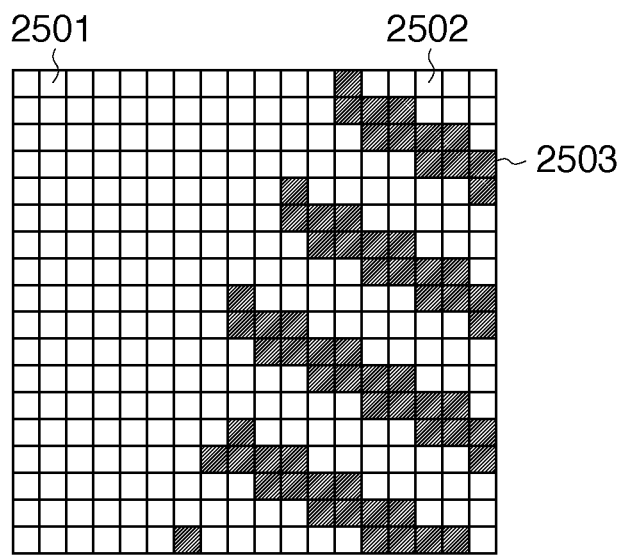
FIG. 11B illustrates an example of halftone image data according to FIG. 11A.

FIG. 11A illustrates image data constituted by pixels 2401 and pixels 2402, the pixels 2401 having a pixel value of "0" for K, and the pixels 2402 having a pixel value of "120" for K. In attribute data, the pixels 2401 correspond to the pixels 2101 in FIG. 10B and the pixels 2402 correspond to the pixels 2102 in FIG. 10B. The pixels 2401 in FIG. 11A are converted by digital halftoning by the halftoning unit 304 into pixels 2501 having a pixel value of "0" for K as illustrated in FIG. 11B. On the other hand, the pixels 2402 are converted into pixels 2502 having a pixel value of "0" for K and pixels 2503 having a pixel value of "15" for K.

Figure 11C:
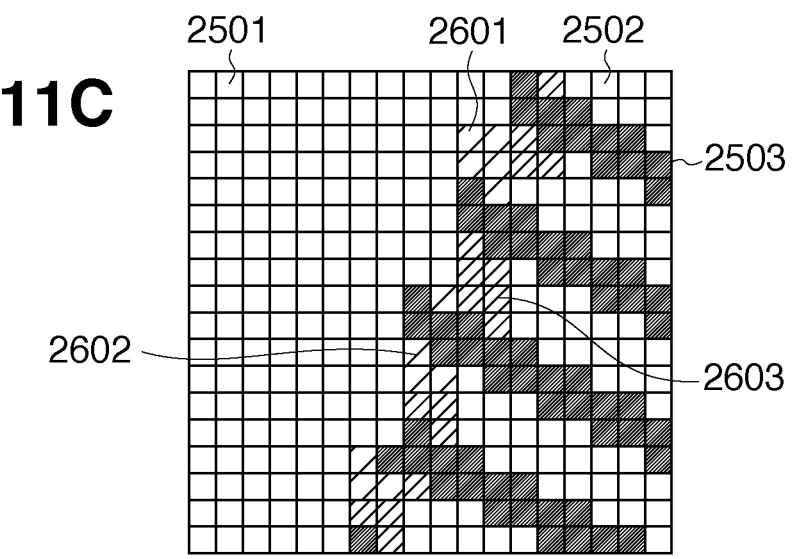
FIG. 11C illustrates an example of the result of the smoothing processing according to FIG. 11A.

FIG. 11C illustrates halftone image data obtained as a result of performing the smoothing processing according to the present embodiment on those pieces of data in FIGS. 11A, 10B, and 11B. It can also be seen in this case that light-color pixels 2601, 2602, and 2603 are added to the boundaries between the pixels 2401 and the pixels 2402, for example, edge portions, so as to make the edge portions smooth.

Edge Processing Example 3

Figure 12A:
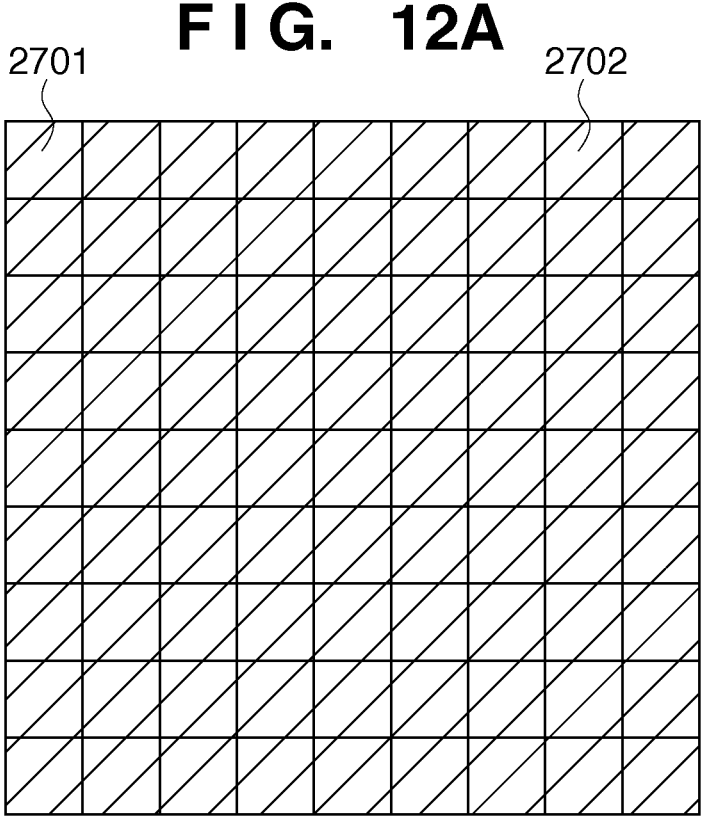
FIG. 12A illustrates a third example of contone image data according to the first embodiment.
Figure 12B:
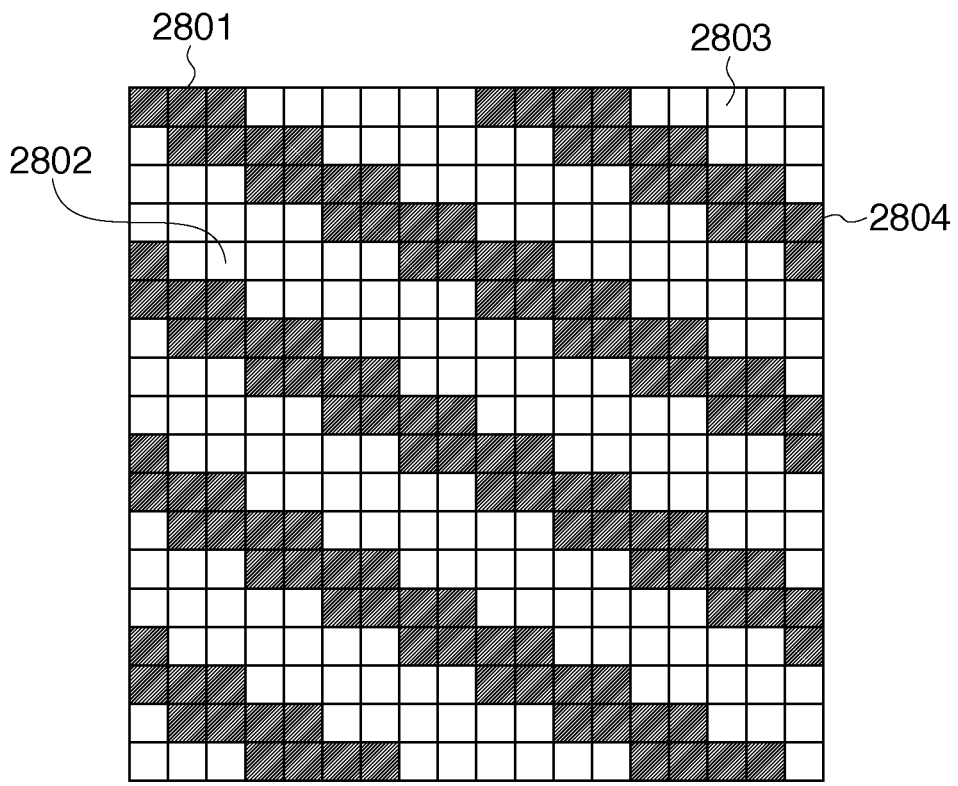
FIG. 12B illustrates an example of halftone image data according to FIG. 12A.

FIG. 12A illustrates image data constituted by pixels 2701 and pixels 2702, the pixels 2701 having a pixel value of "120" for K, and the pixels 2702 also having a pixel of "120" for K. In attribute data, the pixels 2701 correspond to the pixels 2101 in FIG. 10B and the pixels 2702 correspond to the pixels 2102 in FIG. 10B. The pixels 2701 in FIG. 12A are converted by digital halftoning by the halftoning unit 304 into pixels 2801 having a pixel value of "15" for K and pixels 2802 having a pixel value of "0" for K as illustrated in FIG. 12B. Similarly, the pixels 2702 in FIG. 12A are converted into pixels 2803 having a pixel value of "0" for K and pixels 2804 having a pixel value of "15" for K as illustrated in FIG. 12B.

In the case where the smoothing processing according to the present embodiment is performed on those pieces of data in FIGS. 12A, 10B, and 12B, the smoothing processing does nothing because there is no pixel-value boundary between the pixels 2701 and the pixels 2702. Thus, the image data in FIG. 12B is output from the smoothing processing unit 305-1.

Effect of First Embodiment

As described above, according to the present embodiment, the determination signal that determines whether or not to perform smoothing processing for reducing jaggies is generated from the density difference of contone image data. Thus, the smoothing processing is performed on only an edge portion of pixel values, not on an edge portion of attributes. In addition, since the determination signal is corrected according to attribute data, it is possible to prevent unnecessary smoothing processing from being performed on an object whose attribute does not necessitate smoothing processing but which would be undesirably subjected to the smoothing processing if only the pixel value thereof is considered.

Second Embodiment

In a second embodiment of the present invention, a smoothing processing unit 305-2 differs from the first embodiment only in part of the configuration of the smoothing processing unit 305-1 in FIG. 3B, so the same components as those in the first embodiment are denoted by the same reference numerals and will not be described herein.

Figure 13:
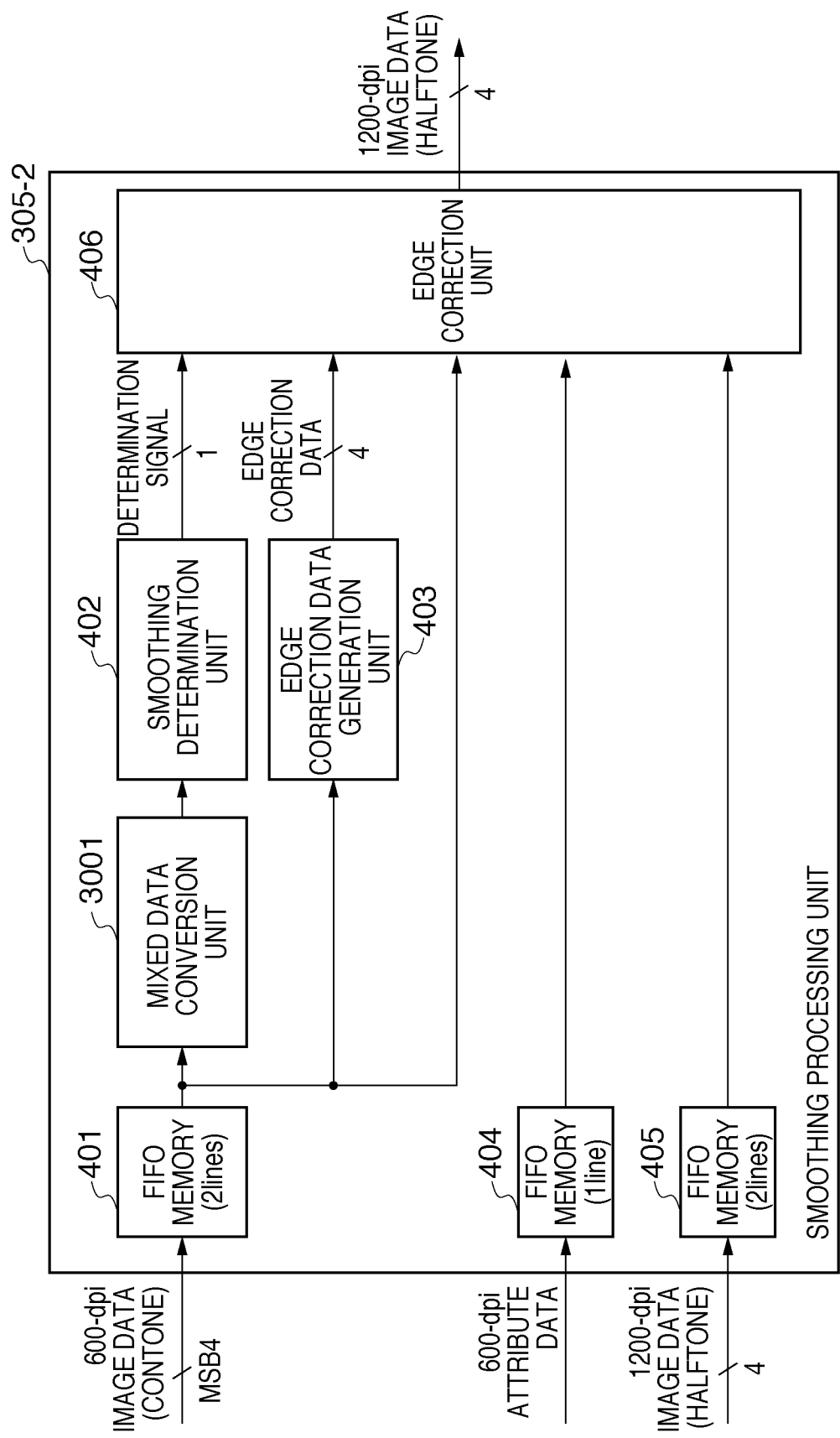
FIG. 13 is a block diagram of a smoothing processing unit according to a second embodiment.

Referring to FIG. 13, the operation of the smoothing processing unit 305-2 according to the second embodiment will be described. The smoothing processing unit 305-2 in FIG. 13 inputs (contone) image data immediately before being input into the halftoning unit 304, (halftone) image data that has been output from the halftoning unit 304, and attribute data. As described before, the contone image data has a 600 dpi resolution and the halftone image data has a 1200 dpi resolution. The attribute data is input with the same 600 dpi resolution as the contone image data. In FIG. 13, the attribute data handled together with the image data is shown for explanation.

The contone image data is accumulated in a FIFO memory 401 in the smoothing processing unit 305-2. At this time, in the contone image data, only the 4 most significant bits of the 8 bits for each image signal are input into the smoothing processing unit 305-2. The FIFO memory 401 delays the contone image data by two lines, forms a 3-by-3 pixel reference area that is constituted by 9 pixels centered on a pixel of interest, and outputs the reference area to a mixed data conversion unit 3001 and an edge correction data generation unit 403. Also, only a single pixel at the center (pixel of interest) in the reference area is output to an edge correction unit 406. Then, the mixed data conversion unit 3001 performs mixed data conversion processing for generating a reference rectangle of mixed data as described later from the reference area, and outputs the reference area to the smoothing determination unit 402. Then, the smoothing determination unit 402 performs smoothing determination processing for determining whether or not to perform smoothing processing according to the reference area of mixed data, and outputs the determination result as a determination signal to the edge correction unit 406. The edge correction data generation unit 403 performs edge correction data generation processing so as to obtain edge correction data for use in edge correction processing as described later from the reference area, and outputs the edge correction data to the edge correction unit 406.

Similarly to the above-described contone image data, the attribute data is accumulated in a FIFO memory 404. The FIFO memory 404 delays the attribute data by one line, and outputs a single pixel of data to the next edge correction unit 406 to match the timing of the pixel of interest in the reference area.

The halftone image data is converted by the halftoning unit 304 into a 4-bit signal with 1200 dpi resolution and is further output as a 2-by-2 pixel rectangular region that is four times the size of a single 600 dpi pixel, to the smoothing processing unit 305-2. A FIFO memory 405 delays the rectangular region of 1200 dpi image data and outputs the 1200 dpi rectangular region, for example, four pixels, to the edge correction unit 406 to match the timing of the contone image data and the attribute data.

The edge correction unit 406 performs edge correction processing as described later using the above-described five pieces of data and outputs a rectangular region constituted by four 4-bit pixels of halftone image data.

Example Conversion Processing by Mixed Data Conversion Unit 3001

Next, the mixed data conversion processing performed by the mixed data conversion unit 3001 of the smoothing processing unit 305-2 according to the second embodiment will be described in detail. Note that the mixed data conversion unit 3001 performs similar mixed data conversion processing for each of the CMYK image signals.

The mixed data conversion processing is the process for performing mixed operation in a predetermined ratio for each of all nine pixels constituting the above-described reference area, using the following equation (2) so as to obtain 4-bit mixed data for each pixel and thereby generate a reference area constituted by those nine pixels.

$$MIX = ((DC \cdot MRC) + (DM \cdot MRM) + (DY \cdot MRY) + (DK \cdot MRK)) >> BS, \text{If}(MIX > 15), MIX = 15 \quad (2)$$

In the equation (2), D represents the pixel value, and an additional character thereof represents the color of each image signal. That is, DC represents the pixel value of cyan (C), DM represents the pixel value of magenta (M), DY represents the pixel value of yellow (Y), and DK represents the pixel value of black (K). Also, MR represents the mixing ratio of each image signal and an additional character thereof represents the color of the corresponding image signal as in the case of the pixel value D, and BS represents the bit shift amount. That is, the sum total of the product of the pixel value D and the mixing ratio MR of each image signal is shifted right by the number of bits indicated by the bit shift amount BS, whereby mixed data MIX for each pixel can be obtained. For example, if all MRs are set to "1" and all BSs are set to "2", it is possible to generate mixed data from an average pixel value of all CMYK image signals. Also, for example, if MRK is set to "5", the other MRs are set to "1", and all BSs are set to "3", it is possible to strengthen the influence of K among the four CMYK image signals. Thus, the above-described determination signal is likely to be set to "correction-on" in the smoothing determination unit 402, which makes the smoothing processing easier to control, such as giving higher priority to the K image signal than to the other image signals during processing.

In the second embodiment, while the equation (2) describes that the sum total of the product of the pixel value D and the mixing ratio MR for each image signal is shifted right by the bit shift amount BS, it is apparent that division may be performed instead of the right shifting, for example. Moreover, since the reference area of mixed data generated by the data conversion unit 3001 is common data among the CMYK image signals, it is apparent that the data, once generated, may be used in the mixed data conversion processing for all of the CMYK image signals, for example.

Specific Example of Smoothing Processing Unit of Second Embodiment

Next, part of the operation of the smoothing processing unit 305-2 according to the present embodiment will be described specifically with reference to FIGS. 14A to 14C. A reference area 3101 illustrated in FIG. 14A corresponds to a reference area of cyan in image data that is constituted by four CMYK image signals, and a reference area 3201 illustrated in FIG. 14B corresponds to reference areas of magenta, yellow, and black. Also, pixels 3102 and pixels 3202 are the same pixels for different image signals, and pixels 3103 and pixels 3203 are the same pixels for different image signals.

Figure 14A:
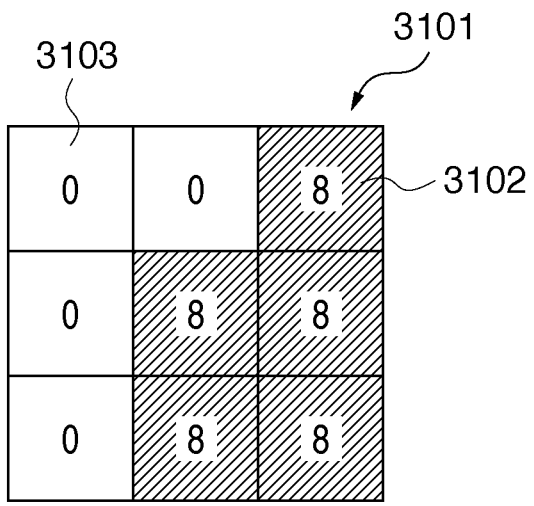
FIGS. 14A to 14C illustrate an example of mixed data generation according to the second embodiment.
Figure 14B:
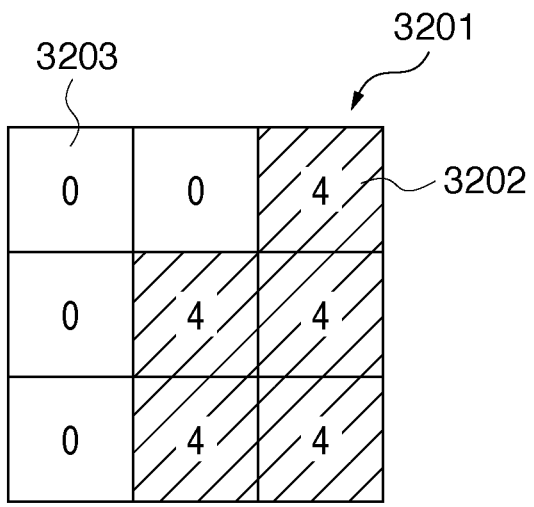
Figure 14C:
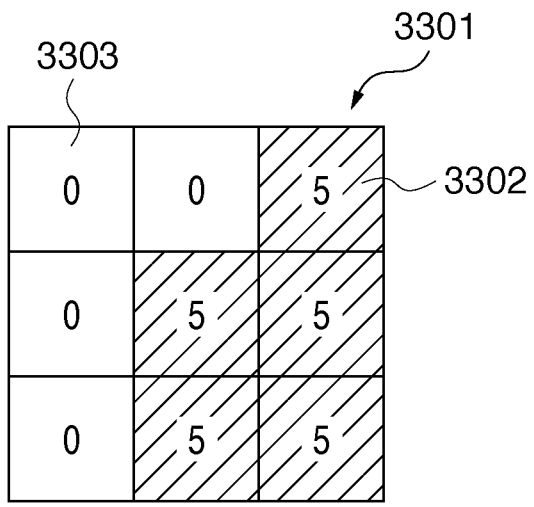

In the case where the reference areas 3101 and 3201 illustrated in FIGS. 14A and 14B are input into the mixed data conversion unit 3001, the mixed data conversion unit 3001 performs the mixed data conversion processing for all of the nine pixels in each of the reference areas. The reference area 3101 is constituted by the pixels 3102 having a pixel value of "8" and the pixels 3103 having a pixel value of "0", whereas the reference area 3201 is constituted by the pixels 3202 having a pixel value of "4" and the pixels 3203 having a pixel value of "0". Those reference areas are converted by the equation (2) into a reference area 3301 of mixed data illustrated in FIG. 14C and then output into the smoothing determination unit 402. The reference area 3301 of mixed data is constituted by pixels 3302 having a pixel value of "5" and pixels 3303 having a pixel value of "0".

In the reference area 3301 of mixed data input into the smoothing determination unit 402, the pixel value "5" of the pixels 3302 is obtained as a maximum value in step S501, and the pixel value "0" of the pixels 3303 is obtained as a minimum value in step S502. Then, in step S503, the density difference "5" therebetween is compared with the threshold value Zsub. In the present embodiment, the threshold value Zsub is assumed to be "4", so that the density difference in the reference area 3301 is higher than the threshold value Zsub, and accordingly, the determination signal OutDataZ for the reference area 3301 is set to "1" and output into the edge correction unit 406. In further processing, this determination signal OutDataZ is used commonly for all of the CMYK image signals to determine whether or not to perform the smoothing processing.

Meanwhile, in the first embodiment, suppose that the reference area 3101 and the reference area 3201 were input into the smoothing determination unit 402, for example. In this case, although the determination signal OutDataZ for the reference area 3101 of cyan is set to "1" because of the density difference in the reference area, "8", the determination signal OutDataZ for the reference area 3201 of the other image signals is set to "0" because of the density difference "4" in the reference area. In other words, the smoothing processing is performed on cyan, but is not performed on the other image signals. Thus, edge correction data for only cyan is output to the respective boundaries separating the pixels 3102 and 3202 that have a pixel value of "0" for all of the four image signals from the pixels 3103 and 3203 that have pixel values higher than "0" for all of the four image signals. As a result, in some cases, those edge portions may be fringed with improper color due to such edge correction data, which results in the generation of false colors.

Effect of Second Embodiment

According to the second embodiment, mixed color data is generated from all image signals, and the determination signal for determining whether or not to perform smoothing processing for reducing jaggies is generated according to the mixed color data. This allows the execution of appropriate processing without generating false colors in edge portions.

Third Embodiment

In a third embodiment, a smoothing processing units 305-3 differs from the first and second embodiments only in part of the configuration of the smoothing processing units 305-1 and 305-2 in FIGS. 3 and 13, so the same components as those in the first and second embodiments are denoted by the same reference numerals and will not be described herein.

Now, the operation of the smoothing processing unit 305-3 according to the present embodiment will be described with reference to FIG. 15.

Figure 15:
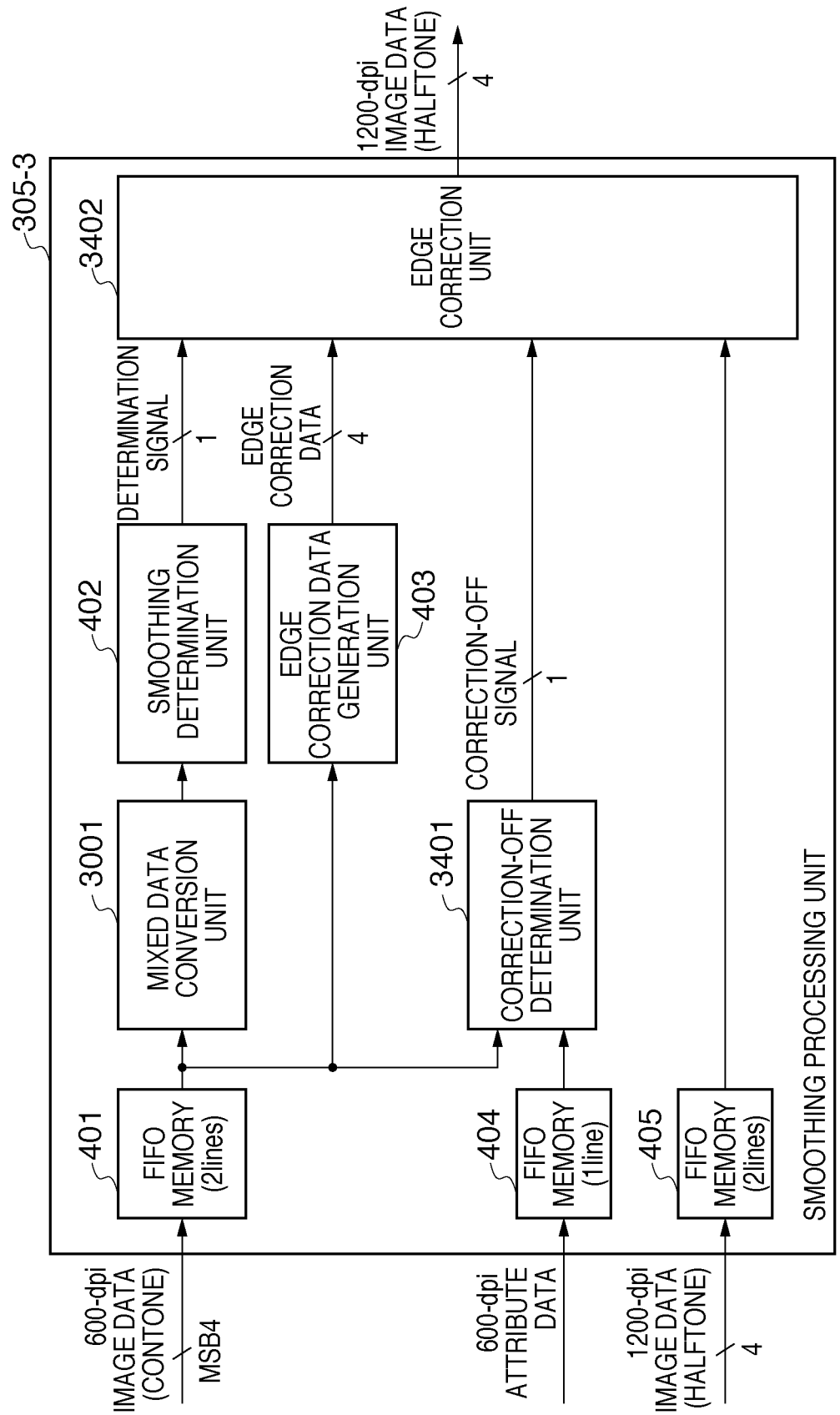
FIG. 15 is a block diagram of a smoothing processing unit according to a third embodiment.

The smoothing processing unit 305-3 in FIG. 15 inputs (contone) image data immediately before being input into the halftoning unit 304, (halftone) image data that has been output from the halftoning unit 304, and attribute data. As described before, the contone image data has a 600 dpi resolution and the halftone image data has a 1200 dpi resolution. The attribute data is input with the same 600 dpi resolution as the contone image data. In FIG. 15, the attribute data that is handled together with the image data is shown for explanation.

The contone image data is accumulated in a FIFO memory 401 in the smoothing processing unit 305-3. At this time, in the contone image data, only the 4 most significant bits of the 8 bits for each image signal are input into the smoothing processing unit 305-3. The FIFO memory 401 delays the contone image data by two lines, forms a 3-by-3 pixel reference area that is constituted by 9 pixels centered on a pixel of interest, and outputs the reference area to an edge correction data generation unit 403 and a correction-off determination unit 3401. Also, only a single pixel at the center (pixel of interest) in the reference area is output to the correction-off determination unit 3401. Then, the mixed data conversion unit 3001 performs mixed data conversion processing for generating a reference rectangle of mixed data as described below from the above-described reference area, and then outputs the reference rectangle to the smoothing determination unit 402. Then, the smoothing determination unit 402 performs smoothing determination processing for determining whether or not to perform smoothing processing according to the reference area of mixed data, and outputs the determination result as a determination signal to an edge correction unit 3402. Meanwhile, the edge correction data generation unit 403 performs edge correction data generation processing so as to obtain edge correction data for use in edge correction processing as described later from the reference area, and outputs the edge correction data to the edge correction unit 3402.

Similarly to the contone image data, the attribute data is accumulated in an FIFO memory 404. The FIFO memory 404 delays the attribute data by one line and outputs a single pixel of data to the next correction-off determination unit 3401 to match the timing of the pixel of interest in the reference area. Then, the correction-off determination unit 3401 performs correction-off determination processing as described later for generating a correction-off signal, using the pixel of interest in the reference area and the attribute data, and then outputs the correction-off signal to the next edge correction unit 3402.

The halftone image data is converted by the halftoning unit 304 into a 4-bit signal with 1200 dpi resolution and is further output as a 2-by-2 pixel rectangular region that is four times the size of a single 600 dpi pixel, to the smoothing processing unit 305-3. A FIFO memory 405 delays the rectangular region of 1200 dpi image data and outputs the 1200 dpi rectangular region, for example, four pixels, to the edge correction unit 3402 to match the timing of the contone image data and the attribute data.

The edge correction unit 3402 performs edge correction processing as described later using the above-described four pieces of data and outputs a rectangular region constituted by four 4-bit pixels of halftone image data.

Example Determination Processing by Correction-Off Determination Unit 3401

Figure 16A:
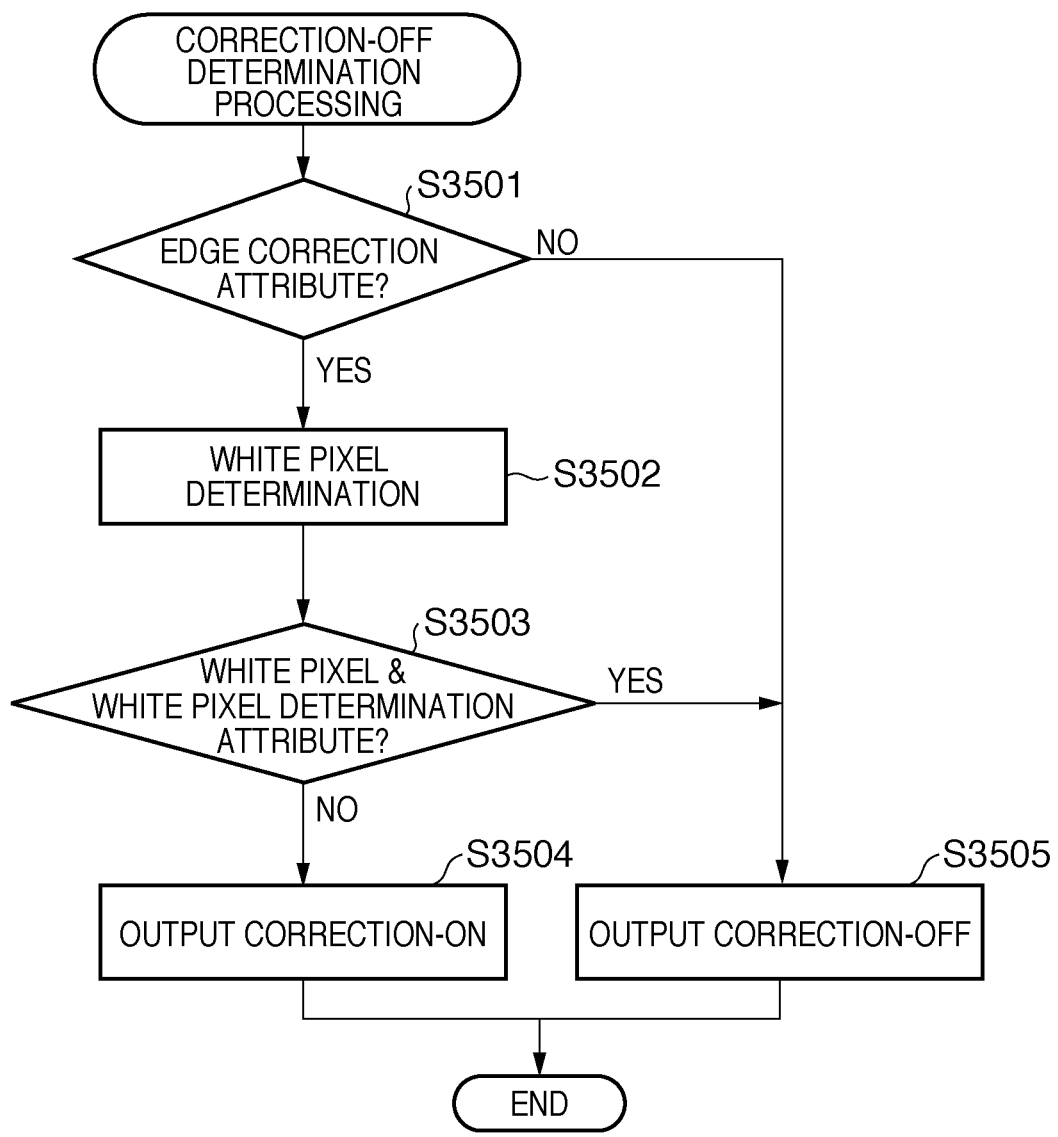
FIG. 16A is a flow chart of correction-off determination processing according to the third embodiment.

Next, the correction-off determination processing performed by the correction-off determination unit 3401 will be described in detail with reference to FIG. 16A. While the processing by the correction-off determination unit 3401 may be implemented by either hardware or software, in the present embodiment, it will be described as computer processing performed by a CPU according to a program. The CPU may be commonly used for the other processing performed in the smoothing processing unit 305-3.

First, the attribute data is determined in step S3501. As described below, the attribute data is single-pixel data with 600 dpi resolution that includes a value representing the attribute of objects such as characters, lines, graphics, and images, and the type of functions such as COPY and PRINT. In step S3501, whether or not to perform smoothing processing is determined according to the attribute data. In the present embodiment, smoothing processing is performed on only characters, lines, and graphics for the print function by way of example, so that if the attribute data has any of those values, the process proceeds to step S3502. If the attribute data has an attribute other than those of characters, lines, and graphics for the PRINT function in step S3501, the process proceeds to step S3505. That is, if the attribute data has a value that represents the attribute or operation of an object other than those described above, the process proceeds to step S3505.

Then, in step S3502, white pixel determination is performed for determining whether or not the pixel of interest in the contone image data is a white pixel. The white pixel as referred to herein is a white-color pixel, for example, a pixel that has a value of "0" for all CMYK image signals. Then, in step S3503, it is determined whether or not the pixel of interest is a white pixel and whether or not the attribute data indicates a white pixel determination attribute. The white pixel determination attribute as referred to herein is the attribute of an object that is referred to at the time of white pixel determination, and in the present embodiment, the attributes of characters and lines are defined as white pixel determination attributes, for example. Thus, if the attribute data has the attribute of either a character or a line and if the pixel of interest is a white pixel, the process proceeds to step S3505. If the pixel of interest is not a white pixel and/or if the attribute data does not represent a white pixel determination attribute, the process proceeds to step S3504.

Then, in step S3504, the value of "1" (correction-on) is output as the correction-off signal OutDataOFF. In step S3505, the value of "0" (correction-off) is output as the correction-off signal OutDataOFF.

This allows control by the attribute of an object, aside from the determination signal generated from the density by the smoothing determination unit 402, thereby preventing adverse effects from being given to objects such as natural images that do not necessitate smoothing processing. In addition, since the correction-off signal is output as "correction-off" for white pixels of characters or lines, it is also possible to eliminate adverse effects such as outline characters or outline lines being narrowed.

In the present embodiment, it has been described that the white pixel represents a pixel that has a value of "0" for all of the CMYK image signals. However, the present invention is not limited thereto, and for example, a pixel that has a value that is not higher than a predetermined threshold value and is regarded as white accordingly may be determined as a white pixel. Moreover, examples of the attribute indicated by the attribute data are not limited to characters, lines, graphics, and images, and they may include, for example, an attribute that indicates small characters with a point size of 4 or less and an attribute that indicates thin lines with a point size of 0.1 or less.

Example Processing by Edge Correction Unit 3402

Next, the edge correction processing by the edge correction unit 3402 according to the present embodiment will be described in detail with reference to FIG. 16B. The edge correction processing according to the present embodiment is processing that additionally includes step S3601 as described later to the edge correction processing described in the first embodiment, so the other steps will not be described herein. Note that the edge correction unit 3402 also performs similar edge correction processing for each of the CMYK image signals. While the processing by the edge correction unit 3402 may be implemented by either hardware or software, in the present embodiment, it will be described as computer processing performed by a CPU according to a program. The CPU may be commonly used for the other processing performed in the smoothing processing unit 305-3.

Figure 16B:
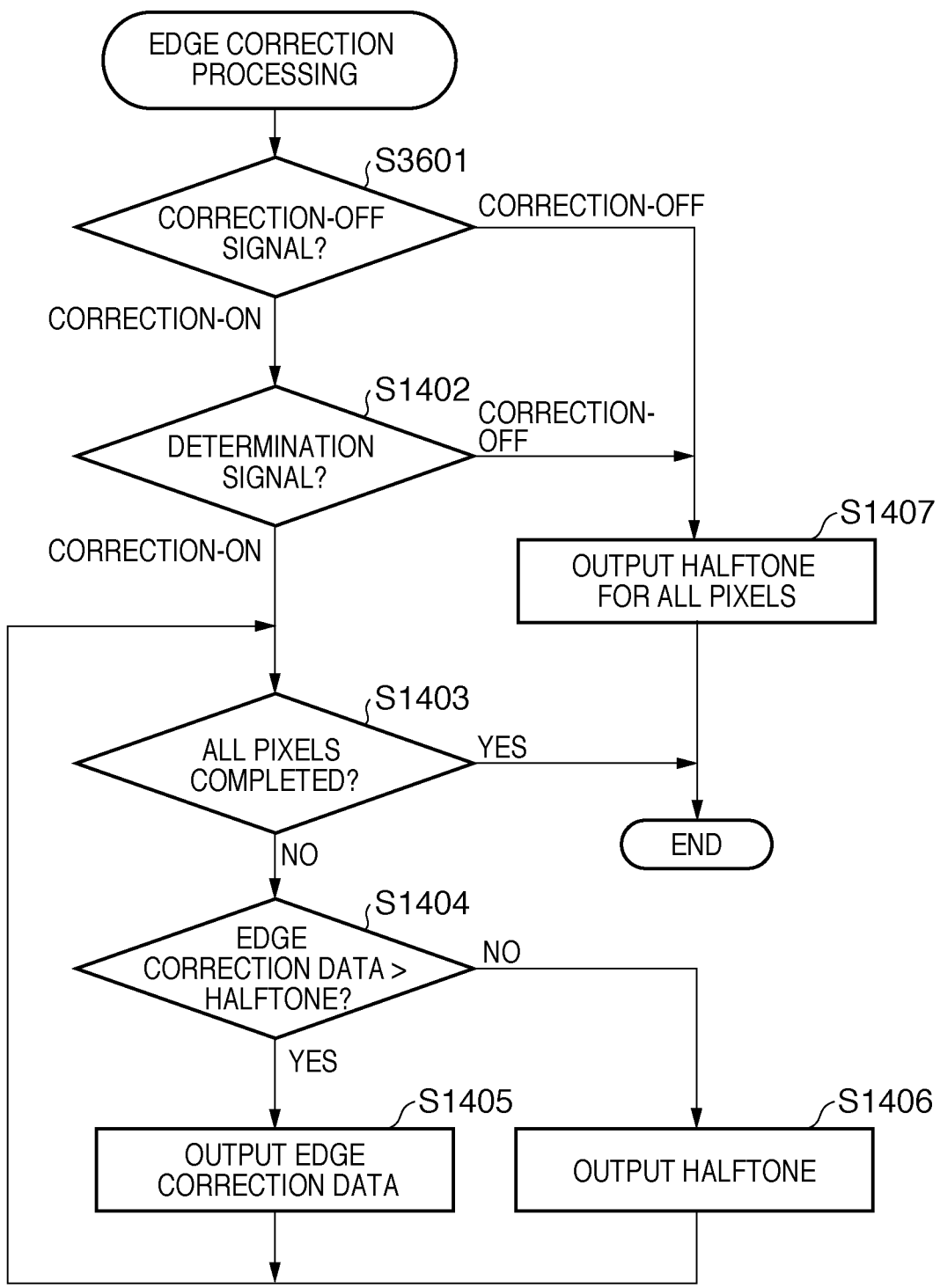
FIG. 16B is a flow chart of edge correction processing according to the third embodiment.

Referring to FIG. 16B, first in step S3601, the edge correction unit 3402 determines whether the correction-off signal OutDataOFF that has been input from the correction-off determination unit 3401 is "correction-on" or "correction-off". If the correction-off signal OutDataOFF is "1" ("correction-on"), then the process proceeds to step S1402. If the correction-off signal OutDataOFF is "0" ("correction-off") in step S3601, then the process proceeds to step S1407, in which the rectangular region of halftone image data is output forcefully.

Effect of Third Embodiment

As described above, according to the present embodiment, the effects similar to those in the first and second embodiments can also be achieved by generating the correction-off signal in the correction-off determination unit 3401, aside from and prior to the output of the determination signal from the smoothing determination unit 402. In addition, there is also the effect of speeding up processing because the smoothing determination processing or the edge correction data generation processing, which is unnecessary if the correction-off signal is "correction-off", is not performed with the operation of software or the like.

Other Embodiments

The present invention can take an embodiment as a system, an apparatus, a method, a program, or a storage medium, for example. Specifically, the present invention may be applied to a system constituted from a plurality of devices or to an apparatus composed of a single device.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-101381, filed on Apr. 17, 2009 which is hereby incorporated by reference herein in its entirety.

What is claimed is:

1. An image processing apparatus comprising:
   a determination unit configured to combine a plurality of image signals that constitute first image data to generate a combined image signal, and determine, based on the combined image signal, whether or not to perform smoothing processing;
   a generation unit configured to generate edge correction data based on the first image data; and
   a smoothing processing unit configured to perform, based on the determination result obtained by the determination unit and attribute data representing an attribute of each pixel included in the first image data, the smoothing processing on second image data obtained by performing digital halftoning on the first image data, using the edge correction data generated by the generation unit.

2. The image processing apparatus according to claim 1, wherein the smoothing processing unit compares an image signal of the second image data and an image signal of the edge correction data and outputs one of the compared image signals based on a result of the comparison.

3. The image processing apparatus according to claim 1, wherein the smoothing processing unit compares an image signal of the second image data and an image signal of the edge correction data, and outputs one of the compared image signals which has a larger signal value as a result of the comparison.

4. An image processing apparatus comprising:
   a determination unit configured to combine a plurality of image signals that constitute first image data to generate a combined image signal, and output, based on the combined image signal, a determination signal indicating whether or not to perform smoothing processing;
   a generation unit configured to generate edge correction data based on the first image data; and
   a smoothing processing unit configured to correct the determination signal based on attribute data representing an attribute of each pixel included in the first image data, and perform, based on the corrected determination signal, the smoothing processing on second image data obtained by performing digital halftoning on the first image data, using the edge correction data generated by the generation unit.

5. The image processing apparatus according to claim 4, wherein
   the first image data is constituted by four image signals of colors cyan, magenta, yellow and black, and the determination unit generates the combined image signal by combining the four image signals of the first image data in a predetermined ratio.

6. An image processing apparatus comprising:
a first determination unit configured to determine, based on first image data, whether or not to perform smoothing processing;
a generation unit configured to generate edge correction data based on the first image data;
a correction-off signal output unit configured to output a correction-off signal indicating that the smoothing processing is not to be performed, based on attribute data representing an attribute of each pixel included in the first image data;
a second determination unit configured to determine, according to the determination result obtained by the first determination unit and the correction-off signal, whether or not to perform the smoothing processing on second image data obtained by performing digital halftoning on the first image data, using the edge correction data generated by the generation unit.

7. An image processing method comprising the steps of:
combining a plurality of image signals that constitute first image data to generate a combined image signal;
determining, based on the combined image signal, whether or not to perform smoothing processing;
generating edge correction data based on the first image data; and
performing, based on the determination result of the determining step and attribute data representing an attribute of each pixel included in the first image data, the smoothing processing on second image data obtained by performing digital halftoning on the first image data, using the edge correction data generated in the generating step.

8. A non-transitory computer-readable storage medium storing an executable program causing a computer to execute an image processing method, the method comprising the steps of:
combining a plurality of image signals that constitute first image data to generate a combined image signal;
generating edge correction data based on the first image data;
determining, based on the combined image signal, whether or not to perform smoothing processing based on the first image data; and
performing, based on the determination result of the determining step and attribute data representing an attribute of each pixel included in the first image data, the smoothing processing on second image data obtained by performing digital halftoning on the first image data, using the edge correction data generated in the generating step.

* * * * *